(12) United States Patent
Djukic et al.

(10) Patent No.: US 10,069,570 B2
(45) Date of Patent: Sep. 4, 2018

(54) MULTI-LAYER MODEM RECLAMATION SYSTEMS AND METHODS

(71) Applicant: Ciena Corporation, Hanover, MD (US)

(72) Inventors: Petar Djukic, Ottawa (CA); Todd Morris, Stittsville (CA); Romualdas Armolavicius, Stitttsville (CA); Stephen Shew, Ottawa (CA)

(73) Assignee: Ciena Corporation, Hanover, MD (US)

( * ) Notice: Subject to any disclaimer, the term of this patent is extended or adjusted under 35 U.S.C. 154(b) by 214 days.

(21) Appl. No.: 15/007,395

(22) Filed: Jan. 27, 2016

(65) Prior Publication Data

US 2017/0214467 A1 Jul. 27, 2017

(51) Int. Cl.
*H04L 12/28* (2006.01)
*H04B 10/40* (2013.01)
*H04L 12/721* (2013.01)
*H04L 12/751* (2013.01)

(52) U.S. Cl.
CPC ............. *H04B 10/40* (2013.01); *H04L 45/02* (2013.01); *H04L 45/124* (2013.01); *H04L 45/62* (2013.01)

(58) Field of Classification Search
CPC .................................................. H04L 67/1097
USPC ........................................................ 370/238
See application file for complete search history.

(56) References Cited

U.S. PATENT DOCUMENTS

| | | | |
|---|---|---|---|
| 7,443,831 B2 | 10/2008 | Shew et al. | |
| 7,782,879 B2 | 8/2010 | Roch et al. | |
| 7,787,494 B1 | 8/2010 | Aubin et al. | |
| 8,644,710 B2 | 2/2014 | Wellbrock et al. | |
| 8,666,247 B2 | 3/2014 | Srinivasan et al. | |
| 8,670,315 B1 | 3/2014 | Armolavicius | |
| 2014/0229210 A1 | 8/2014 | Sharifian et al. | |
| 2014/0310388 A1 | 10/2014 | Djukic et al. | |
| 2014/0328183 A1 | 11/2014 | Au et al. | |
| 2015/0171953 A1 | 6/2015 | Djukic et al. | |

(Continued)

OTHER PUBLICATIONS

Partitioning Procedures for Solving Mixed-Variables Programming Problems; J.F. Benders; Benders Numerische Mathematic 1962.

(Continued)

*Primary Examiner* — Dang Ton
(74) *Attorney, Agent, or Firm* — Clements Bernard Walker PLLC; Christopher L. Bernard; Lawrence A. Baratta, Jr.

(57) ABSTRACT

Modem reclamation systems and methods for optimizing optical modem use in a network include determining costs and capacity range for $L_x$ adjacencies in the network based on $L_x$ information and $L_0$ information, wherein $L_x$ is a digital layer with routed traffic and L0 is a media layer with optical modems that are reclaimed when their utilization is reduced in the digital layer; determining an order of $L_x$ connection moves that minimizes the costs of the $L_x$ adjacencies, to reclaim or minimize the optical modem use; and performing the $L_x$ connection moves based on the order and updating the $L_x$ adjacencies.

18 Claims, 18 Drawing Sheets

(56) References Cited

U.S. PATENT DOCUMENTS

2015/0188837 A1    7/2015  Djukic et al.
2015/0200859 A1    7/2015  Li et al.
2015/0215235 A1    7/2015  Li et al.
2016/0344834 A1*  11/2016  Das .................... H04L 67/1097

OTHER PUBLICATIONS

Integer Programming Algorithms: A Framework and State-of-the-Art Survey; A. M. Geoffrion; R. E. Martsen; Management Science, vol. 18, No. 9, Theory Series (May 1972), 465-491.
Nonliear Integer Programming; Duan Li; Department of Systems Engineering and Engineering Management; The Chinese University of Hong Kong; Shatin, N. T.; Hong Kong; Xiaoling Sun; Department of Mathematics Shanghai University; Baoshan, Shanghai 200444; P. R. China; Springer Science+Business Media, LLC; 2006.
ITU-T G.872 Telecommunication Standardization Sector of ITU (Oct. 2012); Series G: Transmission Systems and Media, Digital Systems and Networks Digital networks—Optical transport networks; Architecture of optical transport networks.

* cited by examiner

MULTI-LAYER MODEM RECLAMATION SYSTEMS AND METHODS

FIELD OF THE DISCLOSURE

The present disclosure generally relates to networking systems and methods. More particularly, the present disclosure relates to multi-layer optical modem reclamation systems and methods.

BACKGROUND OF THE DISCLOSURE

Optical networks are experiencing every growing capacity and, in part, addressing this growth with advanced optical modems supporting high capacity through advanced modulation formats, optical impairment mitigation through electrical domain processing, and the like. Simply put, optical modems are a costly component in optical networks, and it would be advantageous to optimize their usage. Conventional techniques for bandwidth reclamation focus on the release of stranded capacity in a single layer. From a terminology perspective, networks can be logically grouped into Layers, such as the OSI stack, with Layer 0 as a photonic layer, Layer 1 as a Time Division Multiplexing (TDM) layer, Layer 2/3 as a packet, and the like. In operation, optical modems (Modulator/Demodulator) are carrying traffic spanning each of these layers. Conventional techniques utilize control plane functionality in each technological layer, and optimization is therefore limited and focused on that particular technological layer. There is a need for a unified, multi-layer process which can be used for modem reclamation where the modems are carrying multi-layer traffic. Note, the multi-layer modem reclamation problem cannot be solved at each layer individually as each modem carries multi-layer traffic and changes in one layer impact other layers.

BRIEF SUMMARY OF THE DISCLOSURE

In an exemplary embodiment, a modem reclamation method, implemented by one or more controllers, for optimizing optical modem use in a network includes determining costs and capacity range for $L_x$ adjacencies in the network based on $L_x$ information and $L_0$ information, wherein $L_x$ is one or more digital layers with routed traffic that is ultimately carried over $L_0$, and $L_0$ is a media layer with optical modems that are reclaimed when their utilization is reduced in the digital layers; determining an order of $L_x$ connection moves that minimizes the costs of the $L_x$ adjacencies, to reclaim or minimize the optical modem use; and performing the $L_x$ connection moves based on the order and updating the $L_x$ adjacencies. The modem reclamation method can further include performing one of i) repeating the determining steps and the performing step and ii) reclaiming one or more optical modems subsequent to the $L_x$ connection moves, responsive to whether stopping criteria is met. The modem reclamation method can further include, subsequent to the $L_x$ connection moves, disabling the optical modems with no $L_x$ adjacencies thereon. The capacity range for the $L_x$ adjacencies can be determined based on an order in which the optical modems are disabled and links with disabled modems have their associated capacity range decreased accordingly. The optical modems can be disabled based on an optimization technique. The optimization technique can include one of a heuristically calculated merit of removing each modem, Lagrangian decomposition, and Bender's decomposition. The costs for the $L_x$ adjacencies can be based on one or more of i) where modems are disabled, ii) utilization of the $L_x$ adjacencies and (iii) network policy. The method can be implemented in one or more of a $L_x$ controller, a $L_0$ controller, and an inter-layer controller, wherein when the method is implemented by multiple controllers, each of the multiple controllers is adapted to communicate to one another. The $L_x$ can be the digital layer including one or more of Time Division Multiplexing (TDM) and packet layer traffic and $L_0$ can be a Dense Wave Division Multiplexing (DWDM) layer, and wherein the $L_x$ adjacencies are optimized to minimize optical modem usage in the DWDM layer.

In another exemplary embodiment, a modem reclamation system for optimizing optical modem use in a network includes circuitry adapted to determine costs and capacity range for $L_x$ adjacencies in the network based on $L_x$ information and $L_0$ information, wherein $L_x$ is one or more digital layers with routed traffic that is ultimately carried over $L_0$, and $L_0$ is a media layer with optical modems that are reclaimed when their utilization is reduced in the digital layers; circuitry adapted to determine an order of $L_x$ connection moves that minimizes the costs of the $L_x$ adjacencies, to reclaim or minimize the optical modem use; and circuitry adapted to cause the $L_x$ connection moves based on the order and updating the $L_x$ adjacencies. The modem reclamation system can further include circuitry adapted to perform one of i) cause repetition the determine costs and capacity range, the determine the order and the $L_x$ connection moves and ii) cause reclamation of one or more optical modems subsequent to the $L_x$ connection moves, responsive to whether stopping criteria is met. The modem reclamation system can further include circuitry adapted to, subsequent to the $L_x$ connection moves, causes disablement of the optical modems with no $L_x$ adjacencies thereon. The capacity range for the $L_x$ adjacencies can be determined based on an order in which the optical modems are disabled and links with disabled modems have their associated capacity range decreased accordingly. The optical modems can be disabled based on an optimization technique. The optimization technique can include one of a heuristically calculated merit of removing each modem, Lagrangian decomposition, and Bender's decomposition. The costs for the $L_x$ adjacencies can be based on one or more of i) where modems are disabled, ii) utilization of the $L_x$ adjacencies and (iii) network policy. The $L_x$ can be the digital layer including one or more of Time Division Multiplexing (TDM) and packet layer traffic and $L_0$ can be a Dense Wave Division Multiplexing (DWDM) layer, and wherein the $L_x$ adjacencies are optimized to minimize optical modem usage in the DWDM layer.

In a further exemplary embodiment, a system of controllers includes at least one $L_x$ controller; at least one $L_0$ controller; and an inter-layer controller, wherein the at least one $L_x$ controller, the at least one $L_0$ controller, and the inter-layer controller are configured to determine costs and capacity range for $L_x$ adjacencies in the network based on $L_x$ information and $L_0$ information, wherein $L_x$ is one or more digital layers with routed traffic that is ultimately carried over $L_0$, and $L_0$ is a media layer with optical modems that are reclaimed when their utilization is reduced in the digital layers; determine an order of $L_x$ connection moves that minimizes the costs of the $L_x$ adjacencies, to reclaim or minimize the optical modem use; and cause the $L_x$ connection moves based on the order and updating the $L_x$ adjacencies. The $L_x$ can be the digital layer including one or more of Time Division Multiplexing (TDM) and packet layer traffic and $L_0$ can be a Dense Wave Division Multiplexing (DWDM) layer, and wherein the $L_x$ adjacencies are optimized to minimize optical modem usage in the DWDM layer. The at least one $L_x$ controller, the at least one $L_0$ controller, and the inter-layer controller can be in one of a monolithic configuration, a hierarchical configuration, and a distributed configuration.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
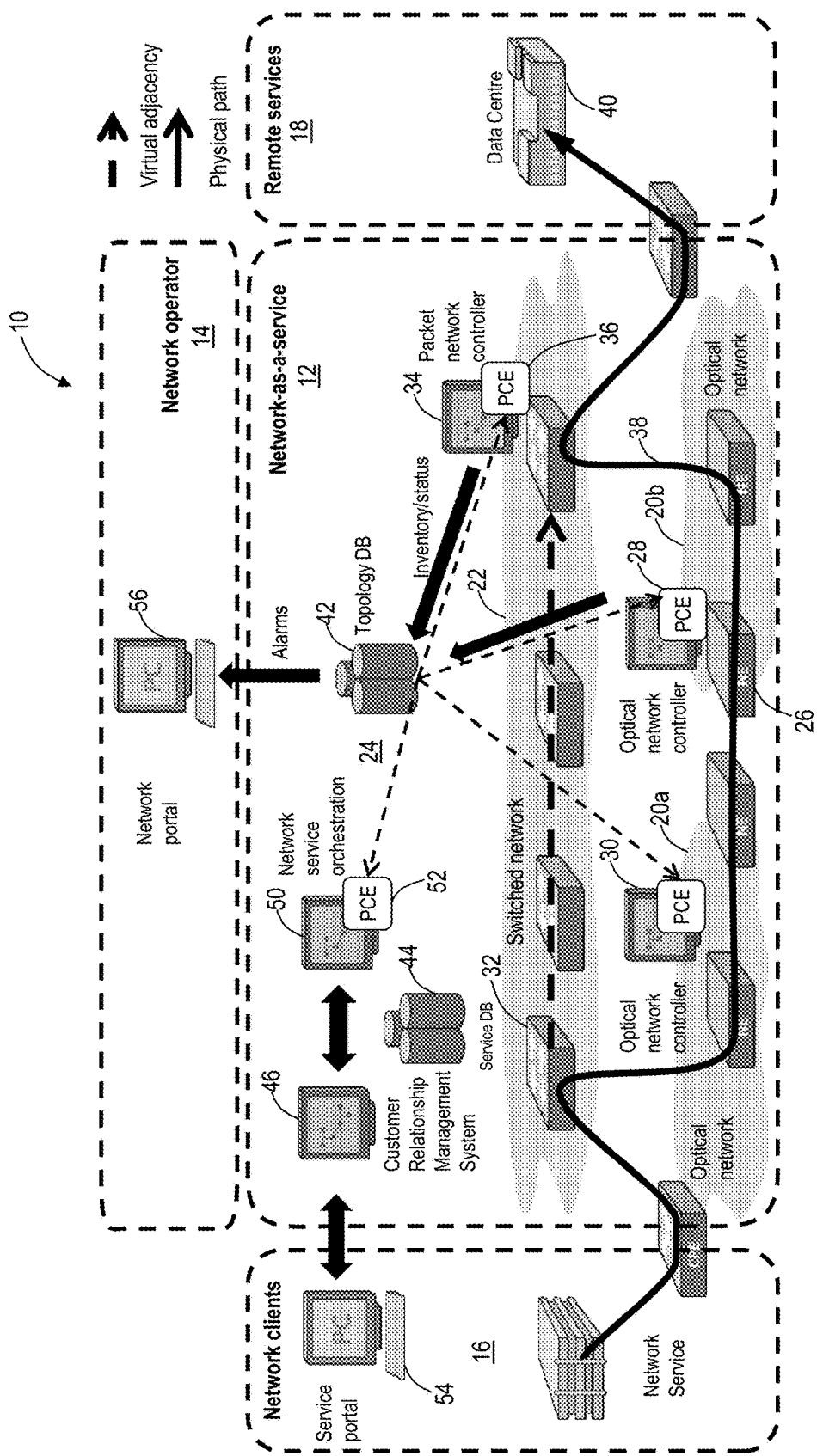
FIG. 1 is a network diagram of a multi-layer, multi-domain network for use with the multi-layer optical modem reclamation systems and methods.
Figure 2:
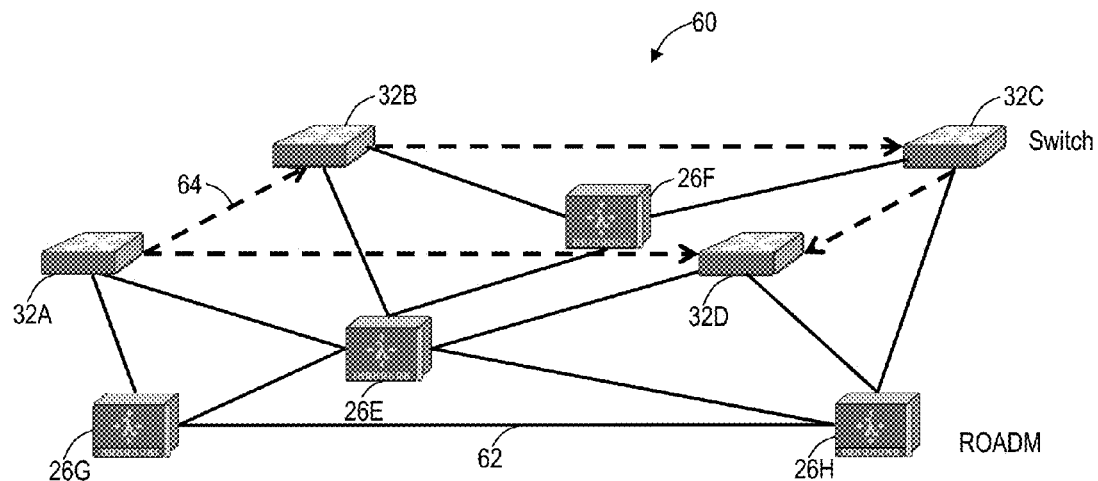
FIGS. 2-7 are network diagrams of an exemplary implementation of modem reclamation in a network including optical network elements and switches.

Again, in various exemplary embodiments, multi-layer optical modem reclamation systems and methods are described. Modem reclamation is the process by which network traffic is re-routed to release optical modems for future traffic. Note, optical modems can also be referred to as transceivers, transponders, or the like. This process can be formalized as a mathematical optimization problem which minimizes the number of modems to support existing network traffic. The optimization is searching for a set of modems that can be turned off while the existing network traffic is still supported. Using mathematical optimization theory, the optimization is decomposed according to network layers, which allows for derivation of optimization algorithms. Two decompositions are presented, each of which leads to a different optimization algorithm. Advantageously, the systems and methods reclaim the modems into a free modem pool, while still carrying the current network traffic. The systems and methods can be distributed over multiple layer controllers as well as with Software Defined Networking (SDN). The systems and methods generally have two main parts: first weights are found for adjacencies in the upper layer based on information in the upper and lower layers; second the traffic in the upper is shifted to minimize the total running cost, using the adjacency weights. After the traffic is shifted, modems can be reclaimed. The approach is based on optimization theory, and embodiments are shown that lead to the maximum number of reclaimed modems.

The systems and methods use combined information related to a multiple layer network to achieve better modem reclamation then what is possible with a portioned network layer network view. The systems and methods can be implemented in a single centralized multi-layer controller, or implemented across multiple single-layer controllers that are interacting with one another. Various embodiments in the disclosure show how the weights can be found and how the method can be implemented across multiple layer controllers with only partial knowledge of resource availability and usage in other layers.

Modem reclamation is a part of many other network optimization processes, such as, for example, network resource optimization, network reconfiguration when traffic patterns change, handling of unexpected traffic changes in emergency situations, etc. For these scenarios, it is advantageous to either carry existing traffic with fewer modems and redeploy surplus modems for unanticipated new traffic or anticipated future traffic. Application of the systems and methods provides network build outs that are deferred, and the network is less expensive to operate. Again, the systems and methods solve modem reclamation by considering multiple layers simultaneously, span multiple network layers controlled by separate network controllers, etc. The foregoing descriptions include multiple exemplary embodiments for various sub-processes, which indicate a full reclamation process. Analytics can be used to forecast traffic patterns, which can be used with the systems and methods.

Multi-Layer, Multi-Domain Network

Referring to FIG. 1, in an exemplary embodiment, a network diagram illustrates a multi-layer, multi-domain network 10 for use with the multi-layer optical modem reclamation systems and methods. Those of ordinary skill in the art will appreciate the network 10 is presented for illustration purposes and the systems and methods described herein contemplate other implementations as well, in other multi-layer optical networks. The network 10 includes four logical groupings—a network-as-a-service (NaaS) 12, a network operator 14, network clients 16, and remote services 18. The network-as-a-service 12 can include two optical networks 20a, 20b, a switched network 22, and a management plane 24. The optical networks 20a, 20b can include network elements 26, such as Reconfigurable Optical Add/Drop Multiplexers (ROADM), DWDM terminals, optical amplifiers, and the like. The optical networks 20a, 20b can also include a control or management plane or the like through a Path Computation Element (PCE) 28 and an optical network controller 30. In an exemplary embodiment, the optical networks 20a, 20b can provide wavelength connectivity and TDM such as Optical Transport Network (OTN). That is, the optical networks 20a, 20b can provide Layer 0 (photonic) and/or Layer 1 (TDM) connectivity. Note, the optical modems that are reclaimed herein are located in the network elements 26.

The switched network 22 can include switches 32 which are interconnected to one another via the optical networks 20a, 20b. In an exemplary embodiment, the switches 32 can provide packet connectivity such as through Ethernet, Multiprotocol Label Switching (MPLS), Internet Protocol (IP), and the like. Thus, the switched network 22 can provide Layer 2/3 packet connectivity. The switched network 22 can include a packet network controller 34 with an associated PCE 36 as well. Note, the network elements 26 can also be Packet-Optical Transport Systems (POTS), integrating L0/L1/L2. Of course, various other exemplary embodiments are contemplated with the network 10 providing an illustration of a multi-layer, multi-domain network. Note, multi-domain is shown, e.g., based on the two separate optical networks 20a, 20b, in different domains with separate optical network controllers 30. There may also be multiple domains in the switched network 22 as well.

In operation, for example, the network-as-a-service 12 provides connectivity for a network service 38 between the network clients 16 and the remote services 18, such as a data center 40. The network service 38 utilizes hardware resources on the network elements 26 and the switches 32 including optical modems in the optical networks 20a, 20b. The network service 38 is a physical path in the network-as-a-service 12, denoted as a solid line. The network 10 includes various virtual adjacencies between the controllers 30, 34 and the management plane 24. In an exemplary embodiment, the management plane 24 is an SDN management plane, and the controllers 30, 34 can be SDN controllers. The management plane 24 can include various SDN applications to realize and orchestrate the modem reclamation systems and method described herein.

The management plane 24 can include a topology database (DB) 42, a service database (DB) 44, a Customer Relationship Management System (CRMS) 46, and a network service orchestrator 50 and an associated PCE 52. Note, the various components 42, 44, 46, 50 can be realized as a server with associated software executed thereon. The topology database 42 maintain virtual adjacencies with the controllers 30, 34 and the associated PCEs 28, 36 for receiving and maintaining inventory, network status, topology, and the like. The topology database 42 can also maintain a virtual adjacency with the network service orchestrator 50 and the associated PCE 52 for providing the inventory, network status, topology, and the like. The service database 44 can include information about currently active network services 38, customers using them, and past service requests. This information in the service database 44 can be used to forecast and predict network demand. The CRMS 46 can include software to track customer requests, services, billing and may present a view of the network services 38 to the customers and negotiate prices with the customer. The CRMS 46 is typically closely coupled, or even implemented as part of business Support Systems (BSS) or Operations Support Systems (OSS). The network clients 16 can interface to the CRMS 46 via a service portal 54. The network operator 14 can receive alarms and the like via the topology database 42 through a network portal 56.

The network service orchestrator 50 is configured to receive requests for the network services 38 and to dispatch them to various layers and domains through the network 10.

Each layer or domain may have its own PCE 28, 34 which calculates a path across that layer. For example, Layer 0 has its own controller 30 independent of other layers. At the time a service request is made, various PCEs 28, 34 may not have good information about where future traffic may reside. This results in stranded bandwidth in multiple layers. Thus, this disclosure deals with modem reclamation.

Modem Reclamation

Modern optical networks, such as the network 10, provide mechanisms to provide on-demand network services using multiple data plane layers and corresponding network layer or domain controllers. Network service demands are served instantaneously in their order of arrival, without the knowledge of potential future demands. Serving network service demands without the knowledge of future demands may lead to an inefficient network resource usage: "stranded" capacity on under-utilized optical modems. Since optical modems are an expensive part of the network to upgrade, it is necessary to provide a reclamation process, which shifts capacity across layers and enables the release of under-utilized modems into the pool of available modems. To get the biggest benefit, the reclamation process should be done by considering multiple network layers simultaneously.

The modem reclamation process can be used in multiple network optimization procedures as a way of increasing network efficiency and deferring of network build-outs. First, for network resource optimization, the modem reclamation produces traffic grooming, which defers adding new equipment to the network 10 and decreases network operating costs (e.g., energy usage). For dealing with traffic shifts, the modem reclamation produces more efficient modem usage, thus freeing-up modems for anticipated future traffic. For dealing with unanticipated emergency situations, the modem reclamation results in more efficient modem usage, allowing for modems to be redeployed for the handling of unanticipated increases in network traffic. For dealing with fragmented optical spectrum, which prevents formation of "super" channels, the modem reclamation can be used to release spectrum where the super channel would reside. In all of the aforementioned scenarios, it is advantageous to carry existing traffic with fewer modems and if necessary to redeploy surplus modems.

Referring to FIGS. 2-7, in an exemplary embodiment, network diagrams illustrate an exemplary implementation of modem reclamation in a network 60 including optical network elements 26E, 26F, 26G, 26H and switches 32A, 32B, 32C, 32D. Again the optical network elements 26E, 26F, 26G, 26H can be ROADMs with modems interconnected via optical fibers 62. The switches 32A, 32B, 32C, 32D connect to the optical network elements 26E, 26F, 26G, 26H via the optical fibers 62 and to one another through virtual adjacencies 64 formed via the optical network elements 26E, 26F, 26G, 26H. The modem reclamation problem in this example can be defined as how to provide services between the switches 32A, 32B, 32C, 32D with a minimum amount of modems in the optical network elements 26E, 26F, 26G, 26H.

Figure 3:
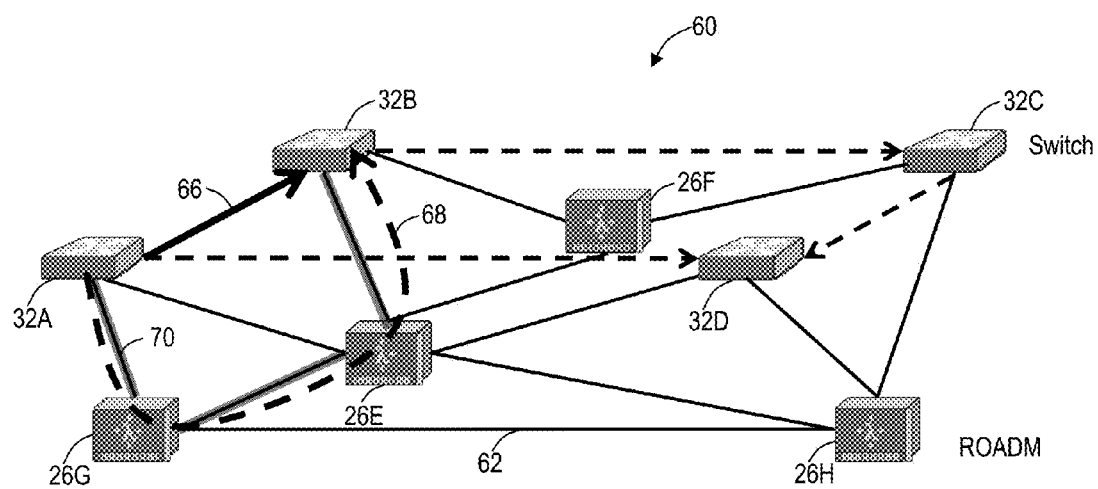
Figure 4:
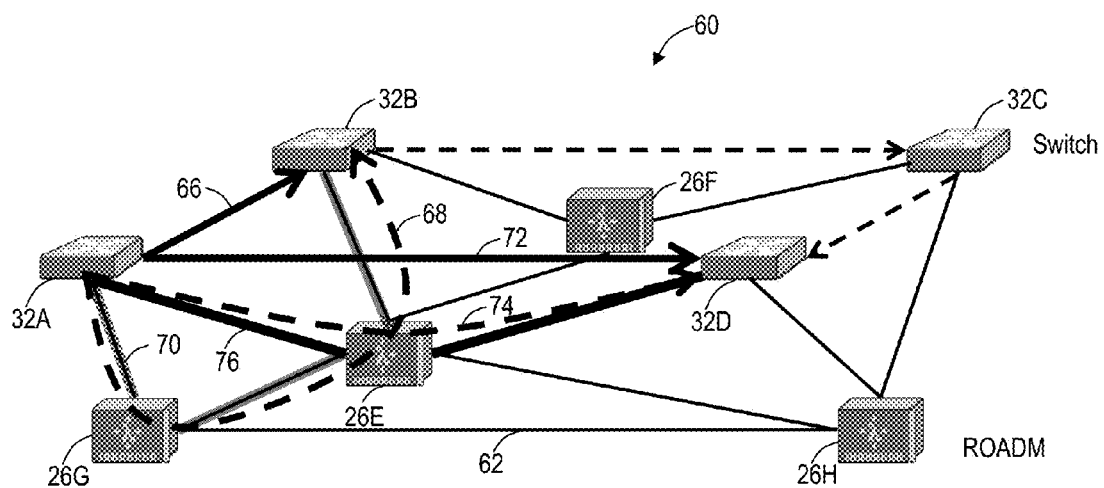
Figure 5:
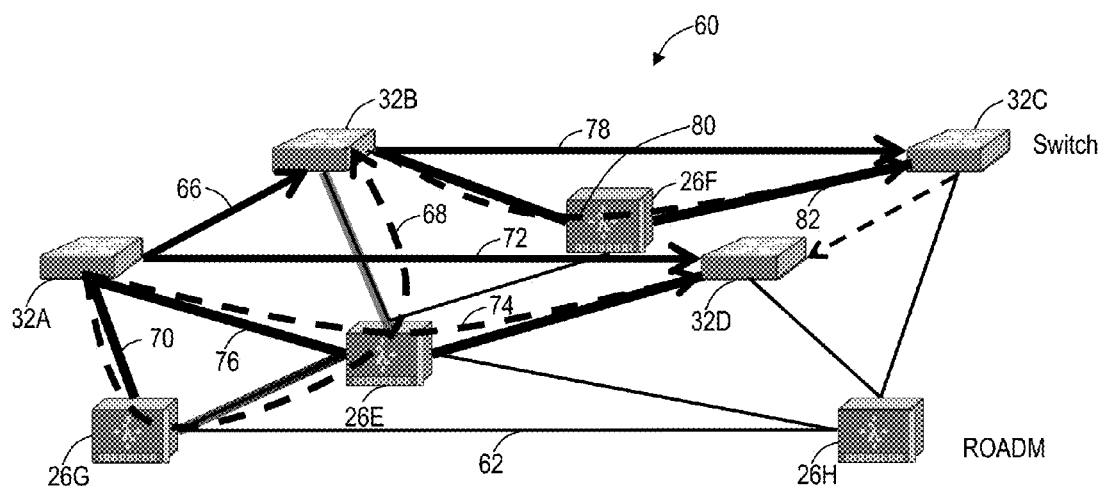
Figure 6:
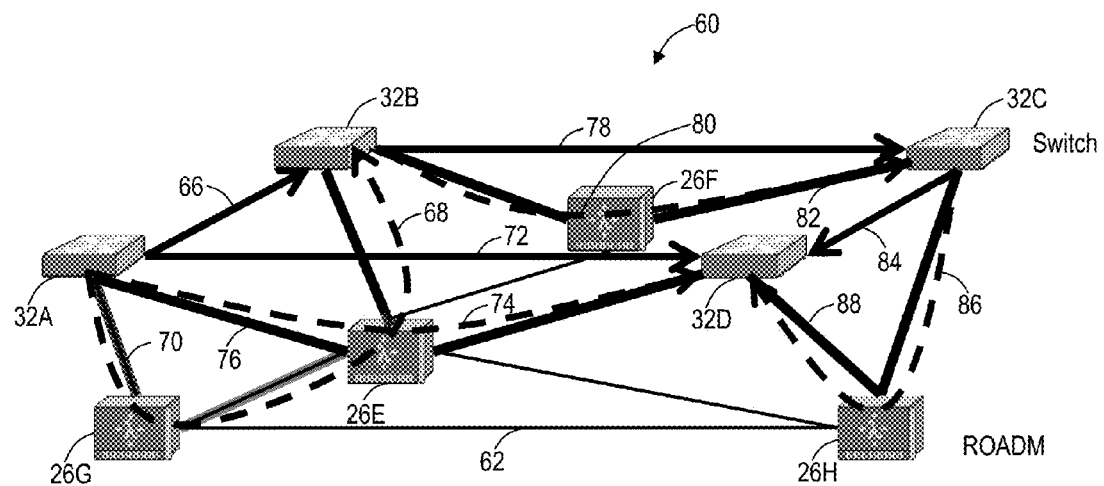

First, in FIG. 3, a demand 66 comes in for a service between the switches 32A, 32B; a path 68 is found between the switch 32A, the optical network elements 26G, 26E, and the switch 32B. The path 68 is lit up via modems as light 70; the demand 66 is provisioned as a $L_x$ connection. $L_x$ is used as an example herein, for $L_1$, but this can be $L_1$, $L_2$ or $L_3$. In FIG. 4, next a new demand 72 comes in for a service between the switches 32A, 32D; a path 74 is found between the switch 32A, the optical network element 26E, and the switch 32D. The path 74 is lit up via modems as light 76; the demand 72 is provisioned as a $L_x$ connection. In FIG. 5, next a new demand 78 comes in for a service between the switches 32B, 32C; a path 80 is found between the switch 32B, the optical network element 26F, and the switch 32C. The path 80 is lit up via modems as light 82; the demand 78 is provisioned as a $L_x$ connection. In FIG. 5, next a new demand 84 comes in for a service between the switches 32C, 32D; a path 86 is found between the switch 32B, the optical network element 26H, and the switch 32C. The path 86 is lit up via modems as light 88; the demand 84 is provisioned as a $L_x$ connection.

Figure 7:
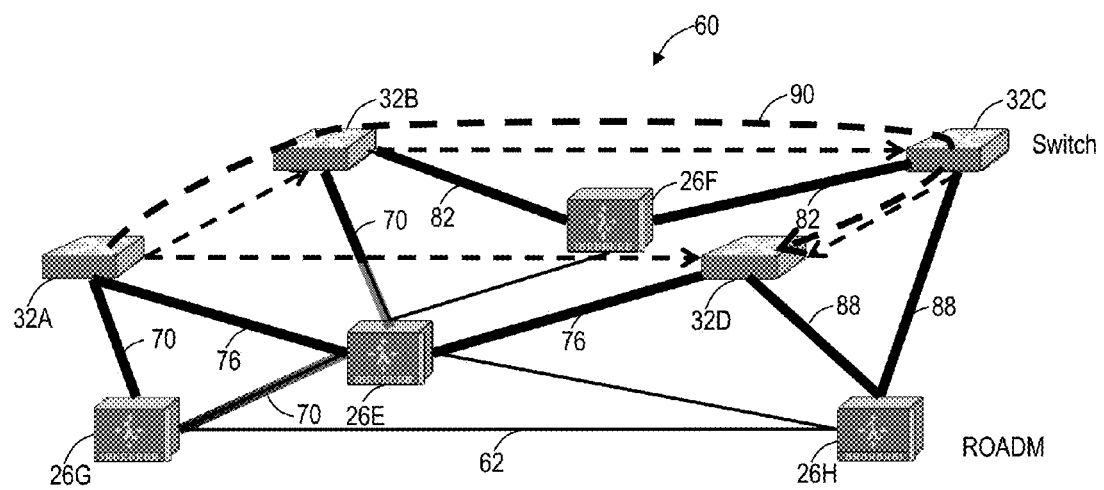

FIG. 7 illustrates all of the light 70, 76, 82, 88 provisioned by modems in FIGS. 3-6. After all the demands 66, 72, 78, 84 are connected, the network 60 has virtual adjacencies A→B, B→C, C→D, A→D. So, a $L_x$ path exists from A→D (A→B→C→D). For example, the demand 72, serviced by the light 76, can be rerouted on a path 90, and the light 76 can be turned off, and the associated modems can be reclaimed and put in a pool of free modems.

Layer-Disjoint Network View

As the network 10 becomes more complex, the layer controllers 30, 34 may be introduced do enable information hiding and scalability. One classification of controllers is into digital and media channel controllers (e.g., ITU-T G.872 "Architecture of optical transport networks" (10/12), the contents of which are incorporated by reference). The digital layer (e.g., OPU, ODU, OTU) can be referred to as $L_x$ and media layers as $L_0$ (Optical Transmission Section (OTSiA)). The general assumption is that modems are in direct correspondence with OTSiA. $L_0$ has the controller 30 responsible for managing its resources (modems, spectrum, fibers, power). The $L_0$ controller 30 provides physical adjacencies to its client layers (e.g., $L_x$). Routing, by the $L_0$ controller 30, is done to provide light paths required for its client layers, e.g., the light 70, 76, 82, 88. Any layer (e.g., $L_1$, $L_2$ or $L_3$) with the routing of end-to-end flows can be a client layer to $L_0$.

A Layer-disjoint path computation is inefficient. Each layer is making sure that it is using resources for its best fit, in isolation of other layers. Upper layers may switch their traffic (aggregate/split) to fit available lower layer resources thus stranding lower layer resources. Lower layers may not be aware of where the resources should be allocated without the knowledge of upper layer needs. On-demand path computation is inefficient. Resources are assigned with the instantaneous knowledge of network usage. Some links may be saturated early if the path computation is too greedy, resulting in stranded resources which are not usable for future connections. Networks are expected to end up with stranded resources over time. Specifically, modems may be underutilized, which is very costly, inefficient, etc. It is important to run a modem reclamation process in the network that releases modems which are underutilized.

Controller Configurations

A modem reclamation process can occasionally be run to release modems not required to carry existing traffic. The process may be triggered by a number of events, such as scheduled network maintenance, forecast or detected blocking of service requests, etc. The process may be run in several network places, such as distributed across several network layer controllers (e.g., the controllers 30, 34), centrally in common network controller (e.g., the network service orchestrator 50), a combination thereof, etc.

Figure 8:
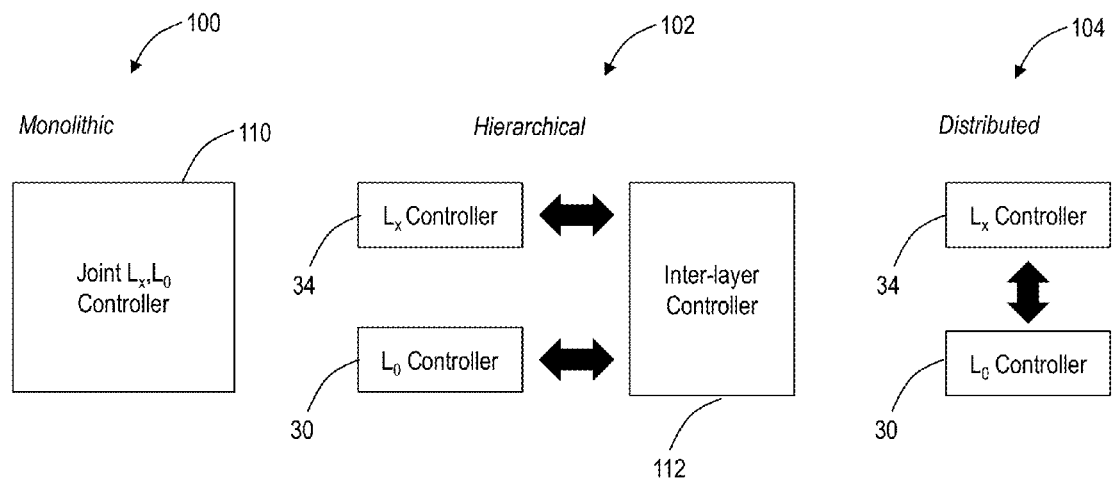
FIG. 8 is a block diagram of exemplary controller configurations for the network and for implementing the modem reclamation systems and methods.

Referring to FIG. 8, in an exemplary embodiment, a block diagram illustrates exemplary controller configurations for the network 10, 60 and for implementing the modem reclamation systems and methods. There are three exemplary controller configurations, namely a monolithic configuration 100, a hierarchical configuration 102, and a distributed configuration 104. The modem reclamation systems and methods spans across multiple layers of the optical protocol stack; thus, there are multiple ways to implement multi-layer controllers in the network. In the monolithic configuration 100, control of both layers is in a single controller (Joint $L_x,L_0$ controller 110). In the hierarchical configuration 102, the controllers 30, 34 can use an intermediate layer to interact, such as through an inter-layer controller 112 (e.g., the network service orchestrator 50). In the distributed configuration 104, the controllers 30, 34 interact directly with each other.

The modem reclamation process can be used with each of the configurations 100, 102, 104. The hierarchical configuration 102 is shown in FIG. 1. The distributed configuration 104 can be obtained by embedding the inter-layer controller 112 in each layer controller 30, 34 and sharing information between the embedded inter-layer controllers. The monolithic configuration 100 is obtained by bundling three controllers in the hierarchical architecture.

Only $L_x$ layer controller knows about end-to-end traffic demands and $L_x$ routing. The $L_x$ controller can be thought of as the traffic engineering/routing controller. Only $L_0$ knows about modems, their rates, reach, etc. $L_0$ may only present a bundled view of available capacity to its client layers (e.g., without showing how the capacity is provided by modems). The information shared between the layers is maintained by the inter-layer controller 112, such as required/granted capacity on $L_x$ adjacencies, the cost of using $L_x$ adjacencies, shared-risk link groups for $L_x$ adjacencies. Note that the inter-layer controller 112 can be absorbed by either layer since the $L_x$ controller needs to track the information about $L_x$ adjacencies such as available capacity and the $L_0$ controller also needs to track information about $L_x$ adjacencies such as used capacity.

Inter-Layer Modem Reclamation Process

Figure 9:
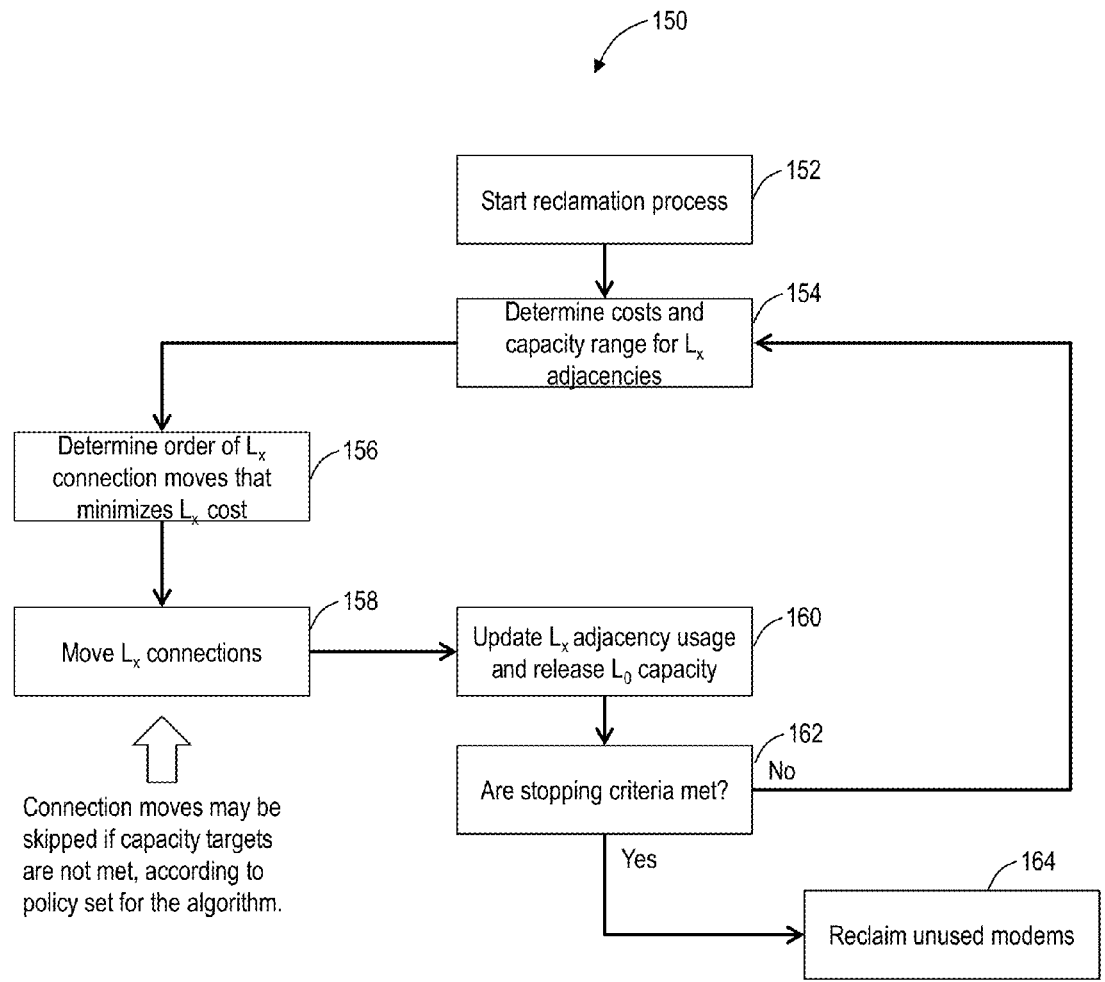
FIG. 9 is a flowchart of an inter-layer modem reclamation process.

Referring to FIG. 9, in an exemplary embodiment, a flowchart illustrates an inter-layer modem reclamation process 150. The modem reclamation process 150 works across multiple layers to reclaim the maximum number of optical modems in the network 10, 60. The modem reclamation process 150 is derived from a mathematical multi-layer optimization modeling the minimization of the number of modems required to support the existing network traffic, which is described in additional detail herein. The modem reclamation process 150 solves the optimization in a way that is particularly amiable to the networking setting. First, it can be implemented to span controllers in multiple network layers, such as through the controller configurations 100, 102, 104. Typically, layer controllers are loosely coupled, and they may be configured in a hierarchal topology (with an inter-layer controller) or in a vertical peer-to-peer topology (e.g. daisy chain of layers). The modem reclamation process 150 works for any controller configuration. Second, the modem reclamation process 150 produces a list of incremental network changes, which is required operationally for minimal disturbance to each connection.

To reclaim optical modems, modem utilization is reduced to a low value or zero. In the media layer, i.e., the optical layer, the optical modems carry a signal that has some maximum information rate of the clients it serves. Utilization refers to the amount of client information that is sent relative to the maximum rate possible over the optical signal. In FIG. 9, $L_x$ refers to one or more digital layers and $L_0$ refers to the media layer (optical). The digital layer may be packet-based (e.g., IP or Ethernet), TDM-based (e.g., OTN based), or a combination of multiple switching technologies. A $L_x$ adjacency refers to a logical connection between packet switches/routers or OTN switches in the digital layer, which may be implemented using one or more optical modems sending information over paths in the fiber network. In the digital layer, packet or OTN traffic is routed over paths consisting of $L_x$ virtual adjacencies. To reduce utilization, connections are moved in the digital layers to free up the optical modems. For example, a move can include removing an ODU3 link (from an OTU4 server layer) by moving Ethernet traffic off of the ODU3 link.

The modem reclamation process 150 starts (step 152) works in iterations, wherein each iteration some of the traffic are moved to the digital layer to make it possible to reclaim a modem in the media layer. The key part of the modem reclamation process 150 are two computational steps 154, 156, which ensure good performance. The modem reclamation process 150 includes determining costs and capacity ranges for $L_x$ adjacencies (step 154). Step 154 uses knowledge exposed by both layers to calculate the set of $L_x$ adjacency weights used by the $L_x$ to re-route traffic. Based on optimization theory, there are several ways to calculate the weights, each with a different level of optimality and complexity. This is explained in additional detail herein. There are many versions of the modem reclamation process 150 depending on how steps 154, 156 are implemented, namely Heuristic/Greedy, Lagrangian dual decomposition, Bender's decomposition, etc.

The modem reclamation process 150 includes determining the order of $L_x$ connection moves that minimize $L_x$ costs (step 156). Based on the weights calculated in step 154, this step 156 reroutes the connections in $L_x$ so that total $L_x$ cost is minimized. This procedure can be implemented using optimization theory (described in additional detail herein) or using a connection ordering heuristic. Once the order is determined (step 156), the modem reclamation process 150 includes moving $L_x$ connections (step 158). Note, the connection moves may be skipped if capacity targets are not met, according to the policy set for the modem reclamation process 150. $L_x$ connections are optionally moved if the target capacities are not met, in a given iteration. The connections are moved if the target capacities are met. But if the capacities are met, the connections may not be moved, and the current modem is skipped.

After step 158, the modem reclamation process 150 includes updating $L_x$ adjacency usage and releasing $L_0$ capacity (step 160). That is, databases are updated to reflect the new network usage. Updating of $L_x$ adjacency capacity ensures that $L_0$ capacity is not increased in an iteration. The modem reclamation process 150 includes checking if stopping criteria are met (step 162), and if not, the modem reclamation process 150 continues to step 154, with the new network usage, and if so, the modem reclamation process 150 reclaims unused modems (step 164). Stopping criteria may depend on various techniques. Exemplary stopping criteria may include stop when at least n modems are released, stop when network costs fit certain criteria, stop when utilization of all modems is above some threshold, stop when nothing changes between iterations (i.e., no connection are moved, no modems are released), multiple criteria are met at the same time (e.g., least number of modems and no modems are moved), etc.

Described herein, three exemplary techniques are described to determine the costs of Lx adjacencies. The first technique calculates the $L_x$ adjacency costs using a modem ranking heuristic, which first choses target modems to be turned off based on heuristically calculated merit of removing the modem. For example, modems with low utilization may be turned off first. The weights for $L_x$ routing are set to route the traffic away from the modems targeted for reclamation. The second technique to calculate the $L_x$ adjacency costs is based on solving a Lagrangian dual of the mathematical optimization minimizing the number of modems in the network (primal problem). The second technique adjusts $L_x$ link costs so that the objective value of the Lagrangian dual function increases in each iteration. The adjustment is based on the information from both layers. This update can be implemented in a hierarchical controller, or through an information exchange between the layer controllers. The connections in $L_x$ are moved until the value of the Lagrangian dual is close to the optimum value of the primal problem. At this point, the modems that can be turned off are turned off.

The third technique to calculate the $L_x$ adjacency costs is based on primal decomposition with Bender's approach. In the Bender's decomposition, the process for selecting modems is separate and enumerates all possible sets of active modems and tests if the traffic can be shifted and still be carried by each set. Optimization theory is used to eliminate branches of the enumeration and speed up the process the search for the minimum cost active modem set. The modem reclamation process 150 can be split into several layer components. Generally speaking, the selection of modems can be done by the $L_0$ controller 30 and determining of the $L_x$ weights can be done by either the $L_x$ controller 34 or the inter-layer controller 112. The weights on the $L_x$ adjacency are broadcast to all layer controllers. The approach of using virtual adjacency weights to communicate between the layers in the resource reclamation can also be extended to support more than two layers.

Again, the modem reclamation process 150 reroutes network traffic to release optical modems for future traffic. This modem reclamation process 150 can be formalized as a mathematical optimization problem. The optimization is searching for a set of modems that can be turned off while the existing network traffic is still supported. Using mathematical optimization theory, the optimization is decomposed according to network layers, which allows for derivation of optimization algorithms. Two decompositions are presented, each of which leads to a different optimization algorithm.

Network Optimization Minimizing the Number of Modems

An optimization solving the modem reclamation problem (1) is shown below with the notation listed in Table 1.

$$\min_{\substack{x_p \geq 0, p \in \mathcal{P}, \\ y_e \geq 0, e \in \mathcal{E}, \\ z_l \geq 0, l \in \mathcal{L}}} \sum_{e \in \mathcal{E}} C_e y_e + \sum_{l \in \mathcal{L}} \frac{C_l}{R_l} z_l \qquad (1a)$$

$$\sum_{p \in \mathcal{P}_k} x_p \geq D_k, k \in \mathcal{K} \qquad (1b)$$

$$\sum_{p \in \mathcal{P}_e} x_p - y_e \leq 0, e \in \mathcal{E} \qquad (1c)$$

$$y_e \in C \qquad (1d)$$
$$e \in \mathcal{E}$$

$$y_e - \sum_{l \in \mathcal{L}_e} z_l \leq 0, e \in \mathcal{E} \qquad (1e)$$

$$z_l \in \{0, R_l\} \qquad (1f)$$
$$l \in \mathcal{L}$$

The optimization takes as input paths for each layer in the network. Loosely speaking, the two layers correspond to a digital layer of the optical network stack ($L_x$) and the media layer of the optical network stack ($L_O$). At the start of the optimization, there is a $L_x$ adjacency for each pair of nodes that carry $L_x$ traffic. It is possible that more than one $L_x$ adjacency exists for a pair of vertices. $L_x$ paths are calculated on the $L_x$ topology graph $G_\mathcal{E}$, which is defined by $L_x$ adjacencies $\mathcal{E}$. For optimum results the set of $L_x$, paths $\mathcal{P}$ is the set of all paths in the $L_x$ topology $G_\mathcal{E}$. In practice, some of the paths are available from the current routing in the network and the rest are calculated while the optimization is solved numerically using the iterative column generation technique. $L_x$ adjacencies are mapped onto $L_O$ paths $\mathcal{L}$ (modem pairs), which are pre-established over the fiber topology $G_F$.

TABLE 1

Notation

Inputs to the optimization

| | |
|---|---|
| $\mathcal{K}$ | Set of known $L_x$ demands |
| k | An $L_x$ demand, k $\in \mathcal{K}$ |
| $D_k$ | $L_x$ capacity required for demand k $\in \mathcal{K}$ (known, or forecast) |
| $\mathcal{E}$ | Set of $L_x$ adjacencies, defining virtual topology |
| $G_\mathcal{E}$ | Graph corresponding to topology formed be $L_x$ adjacencies $\mathcal{E}$ |
| $\mathcal{L}$ | Set of $L_O$ paths, traversing the fiber topology |

Notation used for $L_x$ traffic engineering

| | |
|---|---|
| e | A $L_x$ adjacency, e $\in \mathcal{E}$ |
| $\mathcal{P}$ | Set of $L_x$ paths (calculated on $G_\mathcal{E}$) |
| $\mathcal{P}_k$ | Set of $L_x$ paths used by demand k on the virtual topology $G_\mathcal{E}$; $\mathcal{P}_k = \{p_k\}$ if the demands are not load-balanced across multiple paths |
| $x_p$ | Amount of $L_x$ demand assigned to path p |
| $y_e$ | Capacity required by $L_x$ adjacency, e $\in \mathcal{E}$ |
| $C_e$ | Cost of using $L_x$ adjacency, e $\in \mathcal{E}$ |
| $\mathcal{P}_e$ | Set of $L_x$ paths $\mathcal{P}_e \subseteq \cup_{k \in \mathcal{K}} \mathcal{P}_k$ traversing $L_x$ adjacency e $\in \mathcal{E}$ |

Notation used for $L_O$ traffic engineering

| | |
|---|---|
| l | A fiber path, l $\in \mathcal{L}$ |
| $z_l$ | Capacity available on fiber path (Bits/sec), l $\in \mathcal{L}$ |
| $\mathcal{L}_e$ | Set of $L_O$ paths carrying the capacity of $L_x$ adjacency e |
| $R_l$ | Modem rate used on path l |
| $C_l$ | Cost of using the modem on path l |

The optimization finds the best values for three types of variables: $x_p$, which corresponds to the capacity required for $L_x$ connections, $y_e$, which corresponds to the capacity available on $L_x$ adjacencies, and $z_l$, which corresponds to the capacity provided by $L_O$ paths.

Various parts of the optimization are:

The objective function (1a) minimizes the cost of modems and the cost of $L_x$ topology. Assume, without any loss of generality, that modems are index by cost $C_i \leq C_j$ if i<j. Note that if only some modems need to be removed from the network (e.g. for the purposes of defragmenting the spectrum), the weights on those modems can be made positive numbers, while the weights on other modems can be made 0.

Constraints (1b) ensure that $L_x$ demands are satisfied, ensuring the capacity allocated for $L_x$ connection k is equal to or exceeds the traffic demand ($D_k$). The constraint exists for each demand; the summation is over $L_x$ paths taken by the traffic associated with a demand.

Constraints (1c) ensure that $L_x$ adjacencies have sufficient capacity to carry traffic allocated to $L_x$ paths. The constraint exists for each $L_x$ adjacency (e) and the summation is over $L_x$ paths that traverse that adjacency ($\mathcal{P}_e$).

Constraints (1e) ensure that the capacity allocated for a $L_x$ adjacency is supported by the underlying optical layer path.

The summation in constraint (1d) is over $L_O$ paths ($\mathcal{L}_e$) used by the adjacency associated with a demand.

Constraints (1c) ensure that the $L_x$ adjacencies and optical layer paths conform to optical transport network (OTN) standard container sizes and the optical layer constraints. One way that constraint can be expressed is with:

$$y_e \in \{K_1, K_2, \ldots, K_m\} \ e \in \mathcal{E} \tag{2}$$

where $K_1, K_2, \ldots, K_m$ are container sizes. These constraints may also include limits on the values of capacity available in $L_x$ adjacencies $$L_e \leq y_e \leq U_e \ e \in \mathcal{E} \tag{3}$$

where $L_e$ is the lower bound on the capacity of $y_e$ and $U_e$ is the upper bound on the capacity of $y_e$.

Constraints (if) ensure that the $L_O$ rates correspond to modems on and off states.

Optimization (1) is one example of how this optimization can be formulated. Different formulation options for the optimization, which modify the objective function, or some of the constraints, are also possible. Note that the optimization (1) is an example of an integer programming problem. This type of optimization can be solved using standard integer programming approaches such as branch-and-bound (e.g., A. M. Geoffrion and R. E. Marsten, "Integer Programming Algorithms: A Framework and State-of-the-Art Survey," *Management Science*, vol. 18, no. 9, pp. 465-491, 1972). However, solving the optimization in a multi-layer network setting requires specialized algorithms, which are not readily obvious and are presented in the rest of this document.

Bender's Decomposition

The optimization can be solved with what is known as the Bender's decomposition algorithm (e.g., J. Benders, "Partitioning procedures for solving mixed-variables programming problems," *Numerische Mathematik*, no. 4, pp. 238-252, 1962) through manipulation of constraints (1f). Solving the problem using this decomposition is especially well-suited for a layered solution approach. Bender's decomposition searches for a solution of the space of modem rates $z_l$. This can be written out as an optimization $$\min_{z_l \in \{0, R_l\}} \left\{ \sum_{l \in \mathcal{L}} \frac{C_l}{R_l} z_l + \min_{\{x_p, y_e\} \in \mathcal{N}(\{z_l\}_{l \in \mathcal{L}})} \sum_{e \in \mathcal{E}} C_e y_e \right\}, \tag{4}$$

where $$\mathcal{N}(\{z_l\}_{l \in \mathcal{L}}) = \left\{ x_p \geq 0, p \in \mathcal{P}, y_e \in C, e \in \mathcal{E} \mid \sum_{p \in \mathcal{P}_k} x_p \geq D_k, \right.$$

$$\left. k \in \mathcal{K}, \sum_{p \in \mathcal{P}_e} x_p - y_e \leq 0, y_e - \sum_{l \in \mathcal{L}_e} z_l \leq 0, e \in \mathcal{E} \right\}$$

is the set connection layouts that fit into the network while the modem rates are specified by $\{z_l\}_{l \in \mathcal{L}}$. The problem can now be solved by enumerating all possible sets of modem states (on or off for each modem) $\{z_l\}_{l \in \mathcal{L}}$ and finding one that has a feasible solution in the inner minimization of (4) and that also minimizes the network cost. However, it is possible to have an even better algorithm by using mathematical optimization theory.

The process to solve the optimization (1) using Bender's decomposition can be derived using the decomposed optimization (4). The process works in stages. Each stage corresponds to all network states which have the same number of active modems. Use k to denote the number of active modems in the network. A network state is denoted with $S_k(j) \subseteq \{z_l(k)\}_{l \in \mathcal{L}}$, where k is the number of active modems in the state and j is the index of the state; there are $N_k$ states having the same number of active modems k, indexed with j=1, ..., $N_k$. The cost of a state is given by $$C(S_k(j)) = \sum_{z_l \in S_k(j)} \frac{C_l}{R_l} z_l.$$

The process also keeps track of modems that must be active in a network state $S_k(j)$, $B_k(j)$. The set $B_k(j)$ is used to avoid checking modems once it is known that they must be on.

In each stage, the process goes through the list of possible modem states and tries to turn all of the modems off in each state. Each time a modem is discovered that can be turned off, a new state with fewer modems is created for the next stage. This way all possible and valid network states can be examined.

The process can be formally stated as follows:
1. Start with $S_n(1)=\{z_l(k)\}_{l \in \mathcal{L}}$, $B_n(1)=\{\ \}$, $C_{LB}=C(S_n(1))$, $N_1=1$.
2. For each stage k<N, going backwards do the following
   a. For each set of active modems in the stage $S_k(j)$, j=1, ..., $N_k$
   b. Set $j_k \leftarrow 1$
   c. For each active modem $l \in S_k(j)$ and not in $B_k(j)$ with cost $C(S_k(j)-l) > C_{UB}$, check whether $S_k(j)-l$ can support the given traffic
      i. If $S_k(j)-l$ cannot support traffic add 1 to $B_k(j)$
      ii. If $S_k(j)-l$ can support traffic create $S_{k-1}(j_k)$ and increment $j_k$
   d. Set $$C_{UB} = \max \left\{ C_{UB}, \sum_{l \in \mathcal{L}} \frac{C_l}{R_l} z_l + \max_{\lambda_e \geq 0, e \in \mathcal{E}} \min_{\{x_p, y_e\} \in \mathcal{N}} \sum_{e \in \mathcal{E}} C_e y_e + \sum_{e \in \mathcal{E}} \lambda_e \left( y_e - \sum_{l \in \mathcal{L}_e} z_l \right) \right\} \quad (5)$$

e. Set $B_{k-1}(j_k)$ to $B_k(j)$ for all $j_k$

Step 1 initializes the sets. Step 2 examines all of the states in the stage and possibly creates new states. Step 2.c tries turning off each active modem in a state to see if that's possible. Two outcomes are possible (2.c.i), the modem cannot be turned off, in which case the modem must remain on in all subsequent stages, (2.c.ii) the modem can be turned off, in which case a new set of active modems is created and appended to the next stage. $C_{UB}$ is the upper bound on the solution, so it can be used to bypass checking modems whose turning off does not decrease the cost enough. The upper bound is obtained using the Lagrangian dual on the constraints involving $z_l$:

$$\min_{z_l \in [0, R_l]} \left\{ \sum_{l \in \mathcal{L}} \frac{C_l}{R_l} z_l + \min_{\{x_p, y_e\} \in \mathcal{N}(\{z_l\}_{l \in \mathcal{L}})} \sum_{e \in \mathcal{E}} C_e y_e \right\} =$$

$$\min_{z_l \in [0, R_l]} \left\{ \sum_{l \in \mathcal{L}} \frac{C_l}{R_l} z_l + \max_{\lambda_e \geq 0, e \in \mathcal{E}} \min_{\{x_p, y_e\} \in \mathcal{N}(\{R_l\}_{l \in \mathcal{L}})} \sum_{e \in \mathcal{E}} C_e y_e + \sum_{e \in \mathcal{E}} \lambda_e \left( y_e - \sum_{l \in \mathcal{L}_e} z_l \right) \right\},$$

where $\mathcal{N}(\{R_l\}_{l \in \mathcal{L}})$ is is the set of valid $L_x$ resource allocations on routes, satisfying constraints (1b)-(1c), and fitting in the network when all modems are turned on.

The search can be further speeded up by using the Lagrangian dual. The inner maximization indicates which modems should be added to the pool of modems that should stay active. At the optimum of the inner maximization of the Lagrangian dual, $\lambda_e \geq 0$. For $\lambda_e > 0$, it must be true that $y_e = \sum_{l \in \mathcal{L}_e} z_l$. So, all modems forming adjacency $y_e$ for which dual Lagrangian variables are $\lambda_e > 0$ can be added to $B_k(j)$.

Modem Reclamation Process Based on Bender's Decomposition

Figure 10:
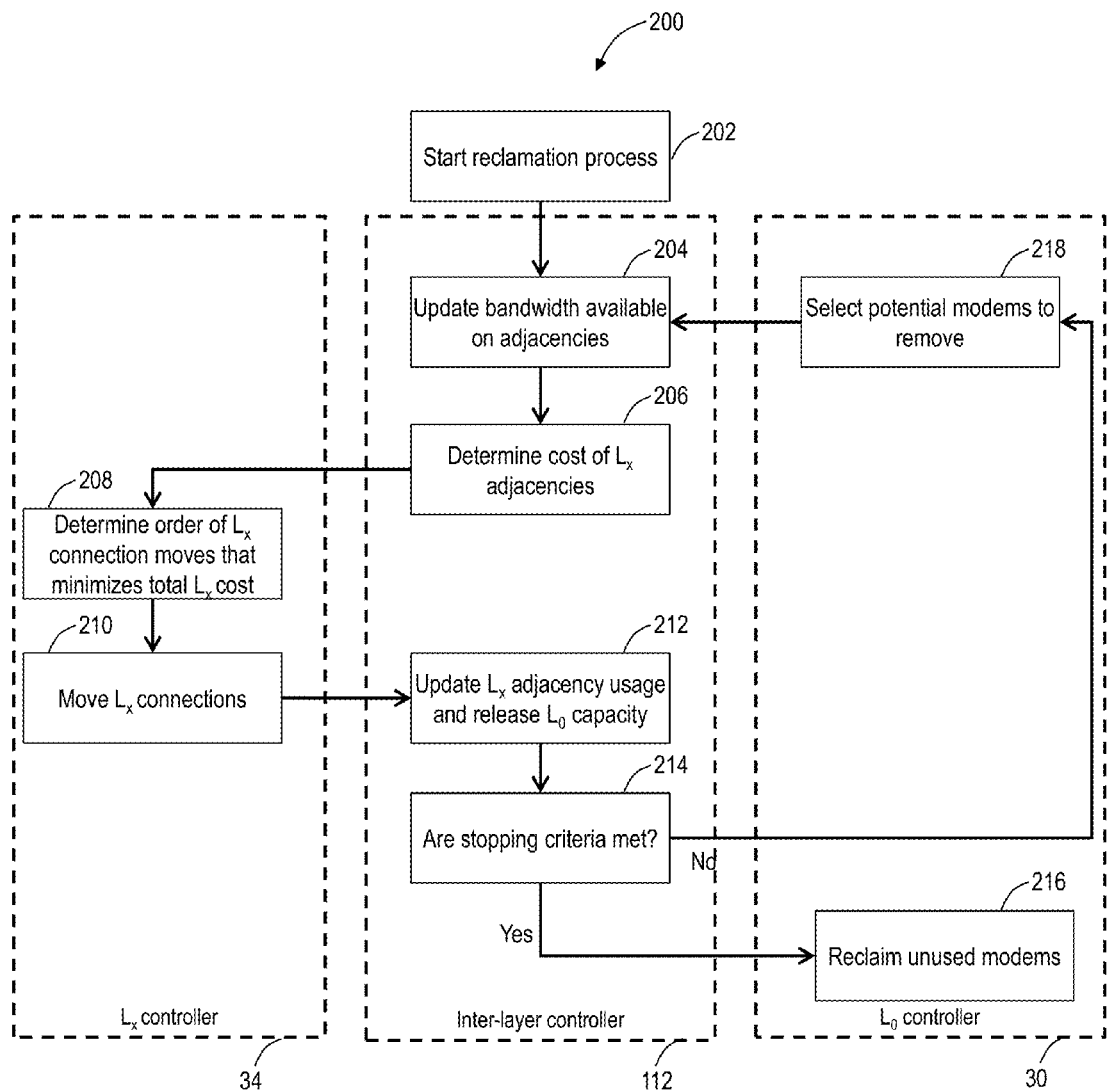
FIG. 10 is a flowchart of a modem reclamation process based on Bender's decomposition of the optimization.

Referring to FIG. 10, in an exemplary embodiment, a flowchart illustrates a modem reclamation process 200 based on Bender's decomposition of the optimization. Logical separation is shown for which steps are performed by the $L_x$ controller 34, the inter-layer controller 112, and the $L_0$ controller 30. Of course, other controller implementations are also contemplated. The modem reclamation process 200 starts (step 202). Similar to steps 154, 156 in the modem reclamation process 150, the modem reclamation process 200 includes updating bandwidth available on adjacencies (step 204), determining the cost of $L_x$ adjacencies (step 206), determining order of Lx connection moves that minimizes total Lx cost (step 208), updating Lx adjacency usage and releasing $L_0$ capacity (step 212), checking if stopping criteria is met (step 214), and if so, reclaiming unused modems (step 216), and if not, selecting potential modems to remove (step 218) and returning to step 204. In an exemplary embodiment, the $L_x$ controller 34 performs steps 208, 210, the inter-layer controller 112 performs steps 204, 206, 212, 214, and the $L_0$ controller 30 performs steps 216, 218.

Step 218 determines the next modem to remove, which keeps track of valid network states and tries to turn a modem off. At step 218, a list of active modems is available, which corresponds to $S_k(j)$. Bender's decomposition algorithm can then be run from that starting point for as many steps as necessary to obtain the next mode to remove. Once the modem is removed, the connections can be moved to minimize the cost of the optimization (1) with fixed values in constraint (1f). Note, this optimization can be solved using shortest path algorithm using the column generation method. The modem reclamation process 200 can use dual variables from that optimization to determine the order of connection moves. Using the dual values in shortest path routing ensures that after the connections are moved the cost of the optimization is minimized.

Figure 11:
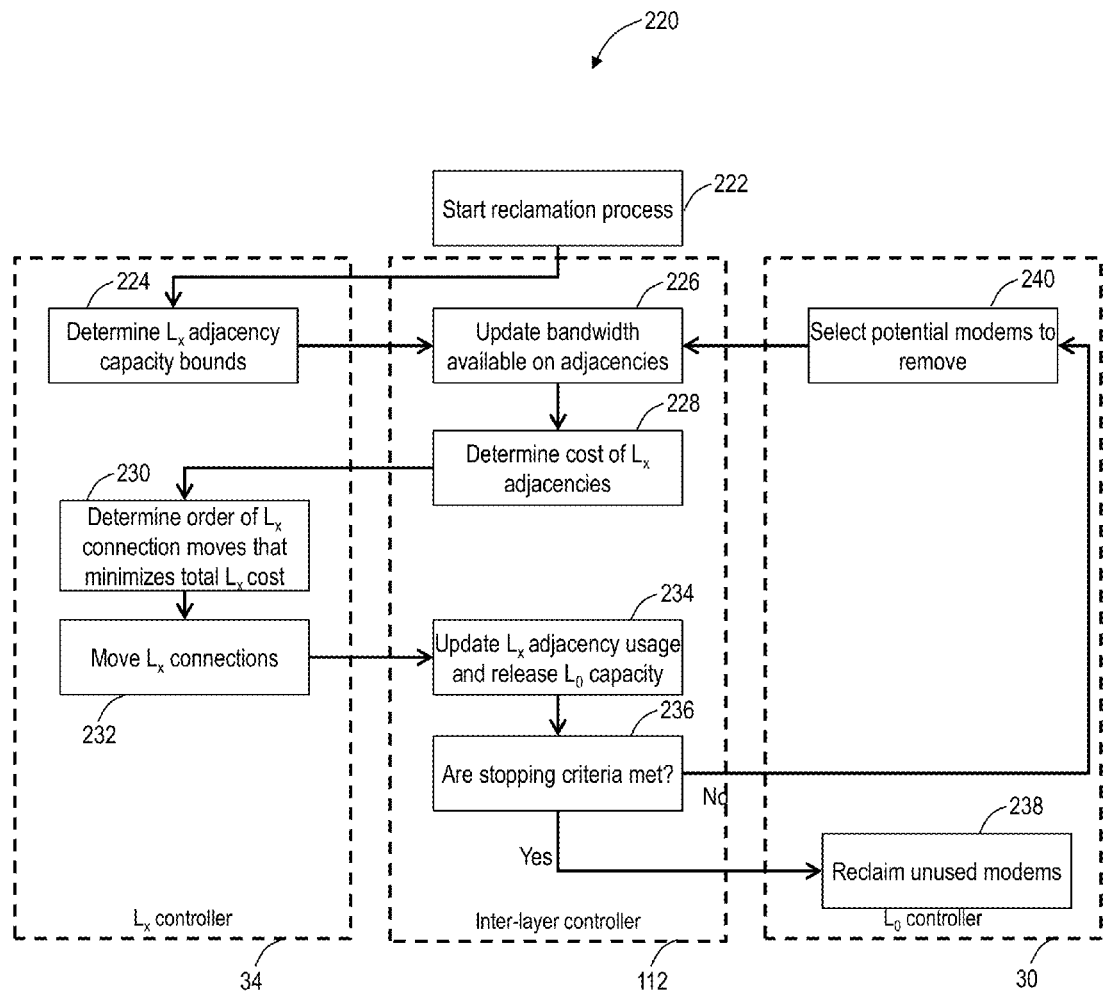
FIG. 11 is a flowchart of another modem reclamation process based on Bender's decomposition of the optimization.

Referring to FIG. 11, in an exemplary embodiment, a flowchart illustrates another modem reclamation process 220 based on Bender's decomposition of the optimization. Again, logical separation is shown for which steps are performed by the $L_x$ controller 34, the inter-layer controller 112, and the $L_0$ controller 30. The modem reclamation process 220 starts (step 222). The modem reclamation process 220 includes determining $L_x$ adjacency capacity bounds (step 224), updating bandwidth available on adjacencies (step 226), determining cost of $L_x$ adjacencies (step 228), determining order of $L_x$ connection moves that minimizes total $L_x$ cost (step 230), moving $L_x$ connections (step 232), updating $L_x$ adjacency usage and releasing $L_0$ capacity (step 234), checking if stopping criteria is met (step 263), and if so, reclaiming unused modems (step 238), and if not, selecting potential modems to remove (step 240) and returning to step 226. In an exemplary embodiment, the $L_x$ controller 34 performs steps 224, 230, 232, the inter-layer controller 112 performs steps 226, 228, 234, 236, and the $L_0$ controller 30 performs steps 240, 238.

Bender's decomposition_enumerates all possible modem states (on or off) and for each combination of the states and tries to fit traffic in the network. However, the number of enumerated modem states can be decreased by careful selection of the next modem to examine. The selection process tracks which modems have been examined. The selection process tracks which modems do not need to be examined based on mathematical properties of the modem reclamation optimization. Some modems can be disregarded from consideration by examining $L_x$ traffic to find the minimum required capacity required on each $L_x$ adjacency.

Lagrangian Decomposition

Another way to solve the optimization is by using Lagrangian decomposition. Optimization (1) can be de-layered by removing the joint layer constraints (1d) using Lagrangian theory. To start, relax the constraints (1f) and allow $z_l$ to take any value in the interval $0 \leq z_l \leq R_l$. The Lagrangian cost function for the problem can be obtained by transferring the constraints (1e) into the objective function to obtain the Lagrangian for the optimization problem:

$$D(\{\lambda_e\}_{e \in \mathcal{E}}) = \min_{\substack{\{x_p, y_e\} \in \mathcal{NN}(\{R_l\}_{l \in \mathcal{L}}) \\ y_e \in C \\ 0 \leq z_l \leq R_l}} \left\{ \sum_{e \in \mathcal{E}} C_e y_e + \sum_{l \in \mathcal{L}_e} \frac{C_l}{R_l} z_l + \sum_{e \in \mathcal{E}} \lambda_e \left( y_e - \sum_{l \in \mathcal{L}_e} z_l \right) \right\}, \quad (6)$$

where $\mathcal{NN}(\{R_l\}_{l \in \mathcal{L}})$ is the set of valid $L_x$ resource allocations on routes when all modems are on. It is an elementary convex optimization theory result that there is a set of $\lambda_e$ that maximize the Lagrangian and that the maximum of the Lagrangian is equal to the minimum of the optimization (1):

$$\max_{\lambda_e \geq 0, e \in \mathcal{E}} D(\{\lambda_e\}_{e \in \mathcal{E}}). \quad (7)$$

The separability of the objective function allows a decomposition of the problem since the sets over which the minimum is defined are disjoint:

$$D(\{\lambda_e\}_{e \in \mathcal{E}}) = \min_{\substack{\{x_p, y_e\} \in \mathcal{N}(\{R_l\}_{l \in \mathcal{L}}) \\ y_e \in C}} \left\{ \sum_{e \in \mathcal{E}} (C_e + \lambda_e) y_e \right\} + \min_{0 \leq z_l \leq R_l} \left\{ \sum_{l \in \mathcal{L}} \left( \frac{C_l}{R_l} - \lambda_l \right) z_l \right\},$$

where $\lambda_l = \lambda_e$, $l \in \mathcal{L}_e$. The separation in the dual function enables solving of the optimization as two separate optimizations one for $L_0$ and one for $L_x$.

The dual problem can be used to solve the optimization with the sub-gradient descent. It is common knowledge from optimization theory that the vector $$\left\{ \hat{y}_e - \sum_{l \in \mathcal{L}_e} \hat{z}_l \right\}_{e \in \mathcal{E}}$$

is a sub-gradient of $D(\{\lambda_e\}_{e \in \mathcal{E}})$. The following sub-gradient algorithm can then be used to arrive at the optimal solution of the dual problem (7):

1. Initialize $\lambda_e(0) \leftarrow 0$ for each $e \in \mathcal{E}$
2. In each iteration k do the following
   a. Find $\{\hat{x}_p, \hat{y}_e\} \in \mathcal{N}$ that minimize $$\min_{\{x_p, y_e\} \in \mathcal{N}(\{R_l\}_{l \in \mathcal{L}})} \left\{ \sum_{e \in \mathcal{E}} (C_e + \lambda_e) y_e \right\} \quad (8)$$

b. Find $\hat{z}_l$ that minimize $$\min_{0 \leq z_l \leq R_l} \left\{ \sum_{l \in \mathcal{L}} \left( \frac{C_l}{R_l} - \lambda_l \right) z_l \right\} \quad (9)$$

c. Find the next set of Lagrangian optimizers $\lambda_e(k+1)$ $$\lambda_e(k+1) \leftarrow \max \left\{ 0, \lambda_e(k) + s_k \left( \hat{y}_e - \sum_{l \in \mathcal{L}_e} \hat{z}_l \right) \right\} \quad (10)$$

d. Go to next iteration if not sufficiently optimal $$\|D(\{\lambda_e(k-1)\}_{e \in \mathcal{E}}) - D(\{\lambda_e\}_{e \in \mathcal{E}}(k-1))\| > \varepsilon \quad (11)$$

for sufficiently small ε.

If it is desirable to pack $L_x$ connections into $L_0$ containers, $\lambda_l = \lambda_e$ in (9) can be replaced with $\lambda_l = \lambda_e + k\epsilon$, where k is the index of the L0 container on the adjacency and ϵ is a small positive number. The dual-based mathematical algorithm can be used to derive a heuristic algorithm for solving the problem. Even though the Lagrangian based process solves the relaxed optimization problem exactly, it is still a heuristic in the sense of the main optimization (1). To get an integer solution, the real values obtained by the algorithm are rounded to integers based on a heuristically set threshold.

Heuristic Process Based on the Lagrangian Dual Descent

Figure 12:
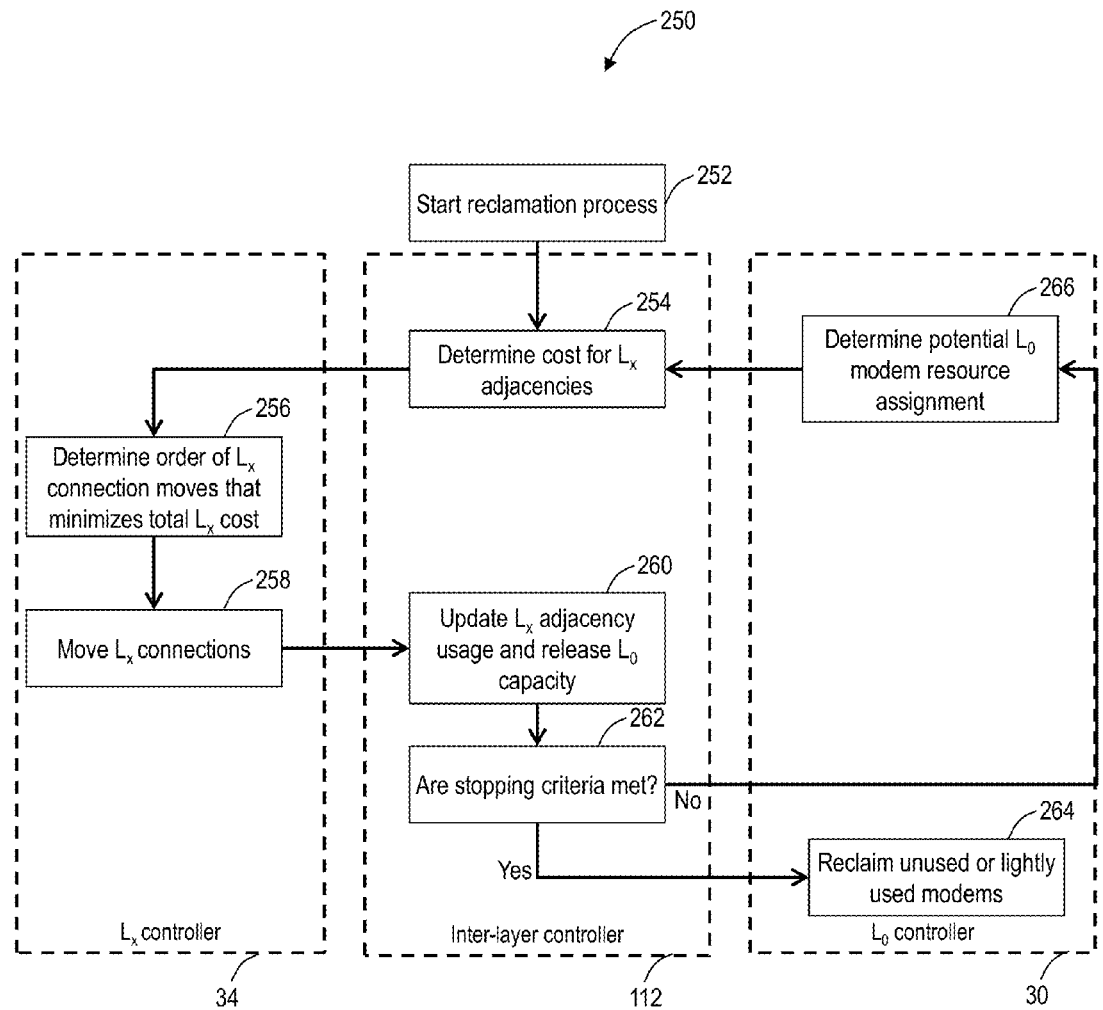
FIG. 12 is a flowchart of a modem reclamation process for a heuristic process based on Lagrangian dual descent.

Referring to FIG. 12, in an exemplary embodiment, a flowchart illustrates a modem reclamation process 250 for a heuristic process based on Lagrangian dual descent. Logical separation is shown for which steps are performed by the $L_x$ controller 34, the inter-layer controller 112, and the $L_0$ controller 30. Of course, other controller implementations are also contemplated.

The modem reclamation process 250 starts (step 252). Similar to steps 154, 156 in the modem reclamation process 150, the modem reclamation process 200 includes determining the cost of $L_x$ adjacencies (step 254), determining order of Lx connection moves that minimizes total Lx cost (step 256), moving the $L_x$ connections (step 258), updating $L_x$ adjacency usage and releasing $L_0$ capacity (step 260), checking if stopping criteria is met (step 262), and if so, reclaiming unused or lightly used modems (step 264), and if not, determining potential $L_0$ modem resource assignment (step 266) and returning to step 254. In an exemplary embodiment, the $L_x$ controller 34 performs steps 256, 258, the inter-layer controller 112 performs steps 254, 260, 262 and the $L_0$ controller 30 performs steps 264, 266. The first three steps "Determine potential $L_x$ connection layout", "Determine potential $L_0$ modem selection", and "Determine $L_x$ adjacency costs" correspond respectively to equations (8), (9), and (10).

Since the sub-gradient is not necessarily an ascent direction for the dual function, the modem reclamation process 250 can be improved. The modem reclamation process 250 can be derived using the so-called sub-gradient bundle calculation (D. Li and X. Sun, Nonlinear integer programming, Springer Science+Business Media, LLC, 2006). The process has two main phases.

The first phase of the process finds a dual ascent guaranteed to increase the value of the dual function. The process terminates when the dual and primal objectives are "close" enough. A test criteria like the one in (11) may be used to establish terminating criteria. After the Lagrangian process terminates a separate procedure goes through and rounds down the modems which are considered to have close to 0 utilization. The second phase of the process removes one or more of the modems from the network. First, a list of connection moves is found using the link costs determined in the first phase. One way to find this list is to solve the optimization (8) using column generation. Modems with the utilization of 0. The next step moves the connections from those modems to free them up. The rate of modems with 0 remaining capacity is then set to $R_j$=0. The capacity is fixed for the remainder of the algorithm run.

Figure 13:
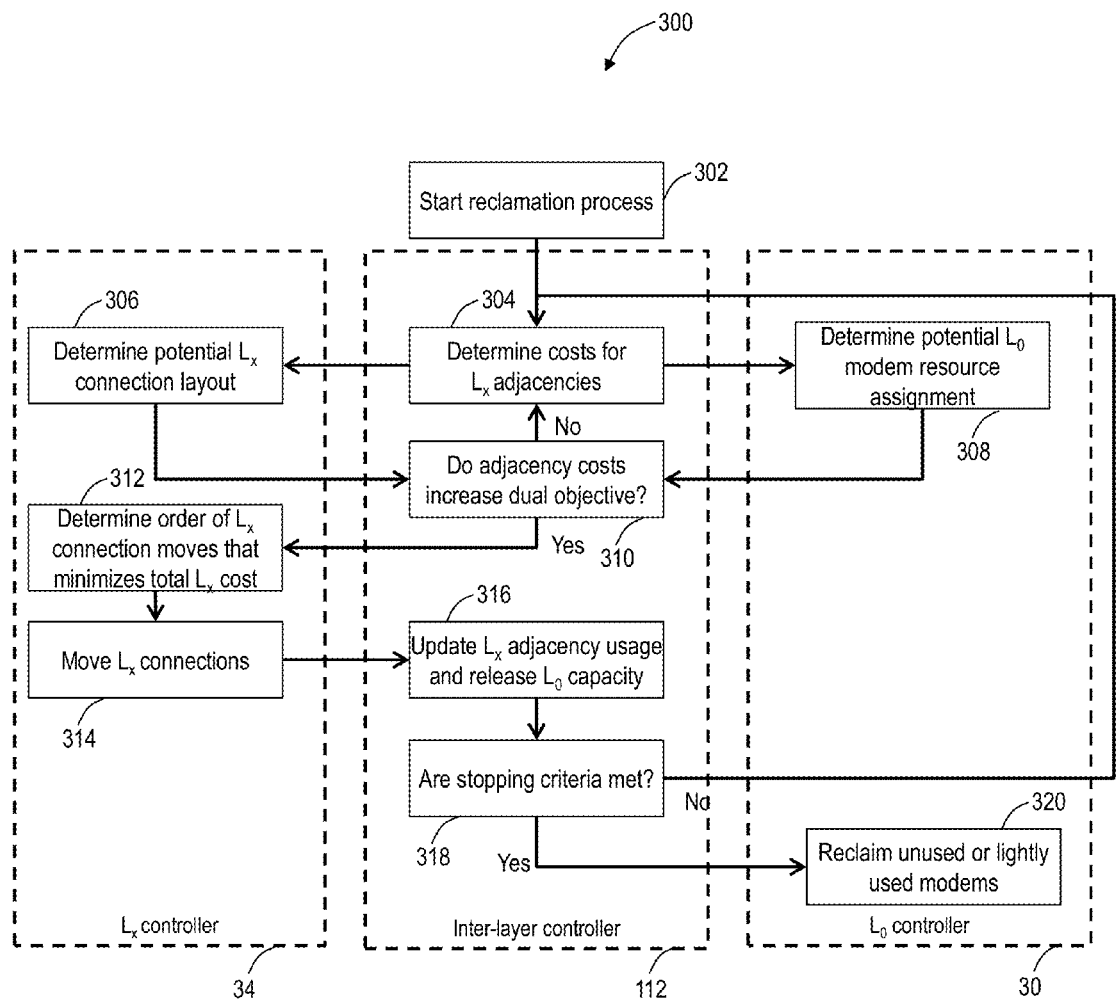
FIG. 13 is a flowchart of a modem reclamation process for another heuristic process based on Lagrangian decomposition with reduced connection churn.

Referring to FIG. 13, in an exemplary embodiment, a flowchart illustrates a modem reclamation process 300 for another heuristic process based on Lagrangian decomposition with reduced connection churn. Again, logical separation is shown for which steps are performed by the $L_x$ controller 34, the inter-layer controller 112, and the $L_0$ controller 30. Of course, other controller implementations are also contemplated.

The modem reclamation process 300 starts (step 302). The modem reclamation process 300 includes determining costs for $L_x$ adjacencies (step 304) and simultaneously determining potential $L_x$ connection layout (step 306) and determining potential $L_0$ modem resource assignment (step 308). After steps 306, 308, the modem reclamation process 300 checks if adjacency costs increase dual objective (step 310), and if not, returns to step 304 and if so, the modem reclamation process 300 includes determining order of $L_x$ connection moves that minimizes total $L_x$ cost (step 312), moving $L_x$ connections (step 314), updating $L_x$ adjacency usage and release $L_0$ capacity (step 316), checking if stopping criteria is met (step 318), and if so, reclaiming unused or lightly used modems (step 320), and if not, returning to step 304. In an exemplary embodiment, the $L_x$ controller 34 performs steps 306, 312, 314, the inter-layer controller 112 performs steps 304, 310, 316, 318 and the $L_0$ controller 30 performs steps 308, 320.

In the Lagrangian decomposition, determining of $L_x$ layout may take advantage of finding lower bound for $L_x$ adjacency capacities (described herein). $L_x$ adjacency costs are calculated from bandwidth assignment to modems (determined by $L_0$) and bandwidth assignment to adjacencies (determined by $L_x$). Each of the steps can be mapped to distributed Lagrangian optimization. Adjacency weights are used in $L_x$ and $L_0$ calculations. Several iterations are done before any connections are moved to ensure that connection moves are not wasted. $L_0$ optimization requires rounding of the modem bandwidth assignments, which is an NP-complete problem. Rounding algorithm is used based on the reclamation algorithm for unused and lightly used modems. The stopping criteria can be based on the difference between the dual cost and the primal costs. $L_0$ costs primary costs can be reported by $L_0$, by adding up the cost of each modem (not visible to the inter-layer controller). $L_x$ costs are known at the inter-layer controller from the adjacency costs and the loading of adjacencies.

Bounds on $L_x$ Adjacency Capacities

Figure 14:
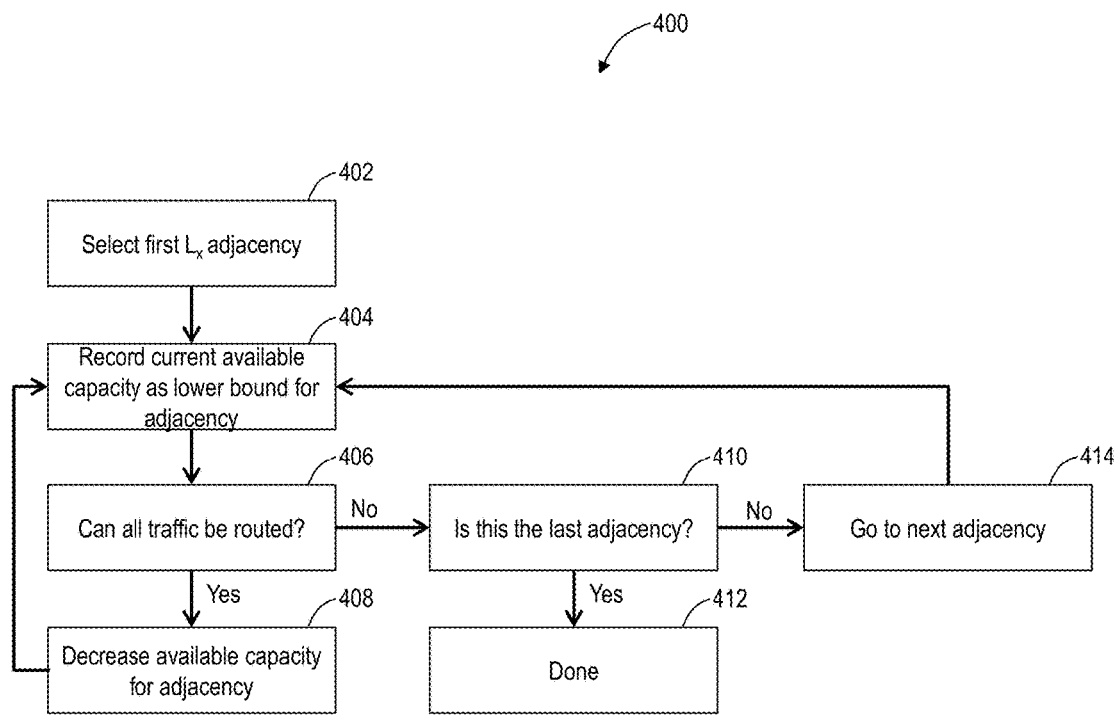
FIG. 14 is a flowchart of a process of finding a lower bound on $L_x$ capacities.

Referring to FIG. 14, in an exemplary embodiment, a flowchart illustrates a process 400 of finding a lower bound on $L_x$ capacities. The complexity of the search for modems that can be turned off can be reduced by finding the modems that must stay on after the optimization in order to support the existing network traffic. This search can be done in the step in the various processes above that determines the bounds on $L_x$ capacities. One way to do the search is to use the relaxed version of the optimization and search for lower limits on $L_x$ adjacency capacities $y_e$ for which it is impossible to route the traffic. Note that the upper limit on the capacity of $y_e$ is given by $$U_e = \sum_{l \in \mathcal{L}_e} z_l$$

from constraints (1e).

The process 400 finds the lower bound and includes selecting first $L_x$ adjacency (step 402), recording current available capacity as lower bound for adjacency (step 408), checking if the traffic can be routed (step 406), and if so, decreasing available capacity for adjacency (step 408) and returning to step 404, and if not, checking if this is the last adjacency (step 410), and if so, the process 400 is done (step 412), and if not, proceeding to the next adjacency (step 414) and returning to step 404.

The process 400 examines the capacity of each $L_x$ adjacency $y_e$ in iterations starting at the upper bound $U_e$ and decrementing by it by small integer δ in each iteration. In each iteration, the process 400 checks if it is possible to re-route the traffic with the relaxed version of optimization (1) where the modem variables are allowed to take real values ($0 \leq z_l \leq R_l$). If re-route is not possible, the process 400 stops examining the adjacency and a lower bound on the required capacity $U_e$ is found. After all the links are re-examined, the original problem can be enhanced with the upper and lower bounds for each virtual adjacency $$L_e \leq y_e \leq U_e.$$

Generally speaking, a lower bound like that speeds up calculations since it limits the number of possibilities that should be examined. More specifically, the lower bound allows fixing some of the modems at a rate required to support that minimum required bandwidth and, therefore, it removes the number of modems that should be examined by the Bender's procedure.

Heuristic Reclamation of Unused and Lightly Used Modems

Figure 15:
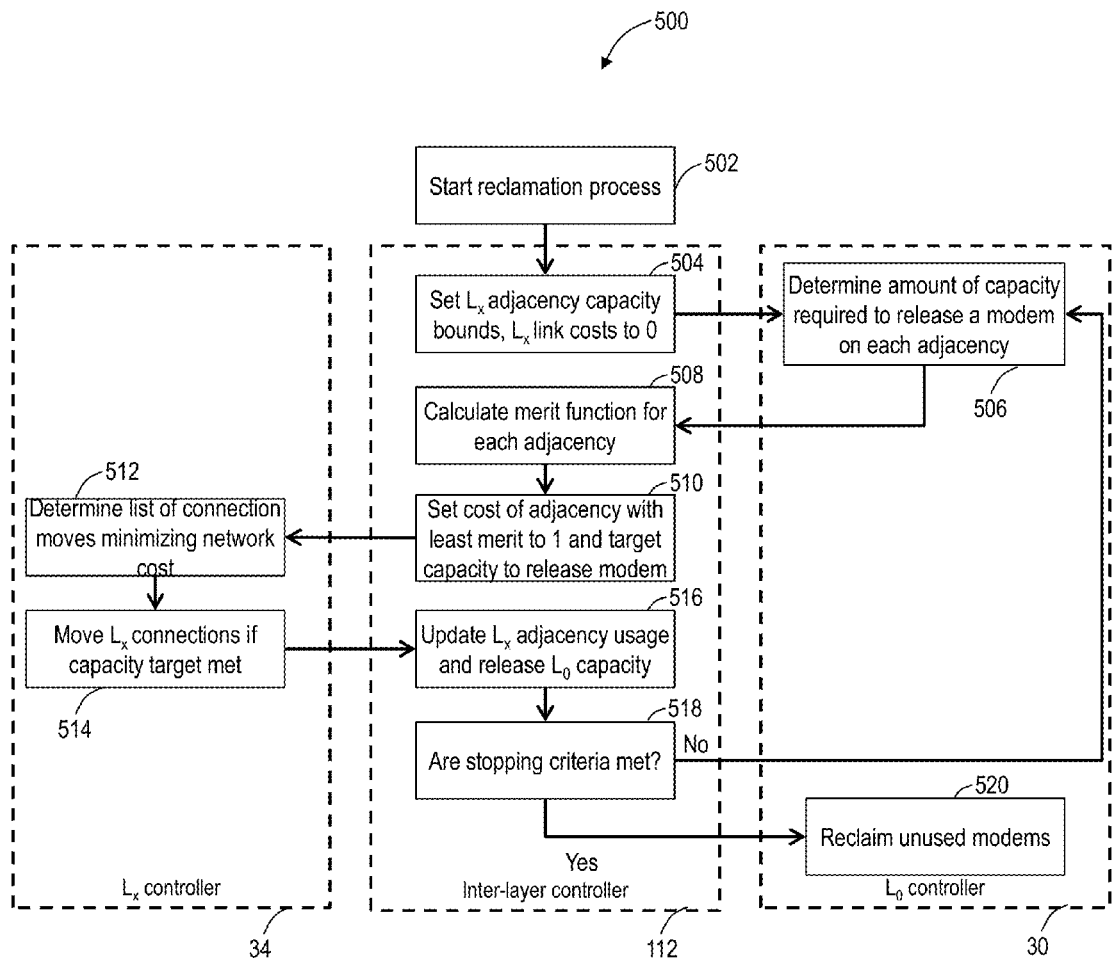
FIG. 15 is a flowchart of a heuristic reclamation process for unused and lightly used modems.

Referring to FIG. 15, in an exemplary embodiment, a flowchart illustrates a heuristic reclamation process 500 for unused and lightly used modems. Again, logical separation is shown for which steps are performed by the $L_x$ controller 34, the inter-layer controller 112, and the $L_0$ controller 30. Of course, other controller implementations are also contemplated. The heuristic reclamation process 500 starts (step 502). The heuristic reclamation process 500 includes setting $L_x$ adjacency capacity bounds, $L_x$ link costs to zero (step 504), determining an amount of capacity required to release a modem on each adjacency (step 506), calculating a merit function for each adjacency (step 508), setting cost of adjacency with least merit to 1 and target capacity to release modem (step 510), determining a list of connection moves minimizing network cost (step 512), moving $L_x$ connections if capacity target met (step 514), updating $L_x$ adjacency usage and releasing $L_0$ capacity (step 516), checking if stopping criteria is met (step 518), and if so, reclaiming unused or lightly used modems (step 520), and if not, returning to step 506. In an exemplary embodiment, the $L_x$ controller 34 performs steps 512, 514, the inter-layer controller 112 performs steps 504, 508, 510, 516, 518, and the $L_0$ controller 30 performs steps 506, 520.

The heuristic reclamation process 500 keeps reclaiming modems most likely not required in the network until no more modems can be removed. $L_0$ determines the state of utilization of the modems and passes information to the inter-layer controller 112. Information can be about a single modem or a list of modems (i.e., capacity used, utilization). The inter-layer controller 112 calculates a merit function for each adjacency, based on the modem situation. The merit function is designed so that adjacencies with the most under-utilized modems are selected of adjacencies with well-utilized modems. The merit can be utilization as well as utilization plus a random number (e.g., from a normal distribution) to mimic simulated annealing. The results of the merit function are used to assign the costs to adjacency for traffic engineering purposes. Assigning a cost of 1 to the adjacency with the lowest merit ensures traffic is removed from that adjacency during the iteration. $L_x$ connections are optionally moved if the target capacities are not met. The connections are moved if the target capacities are met. But if the capacities are met, the connections may not be moved, and the current modem is skipped.

Hierarchical Modem Reclamation Through Shared Link Costs

Figure 16:
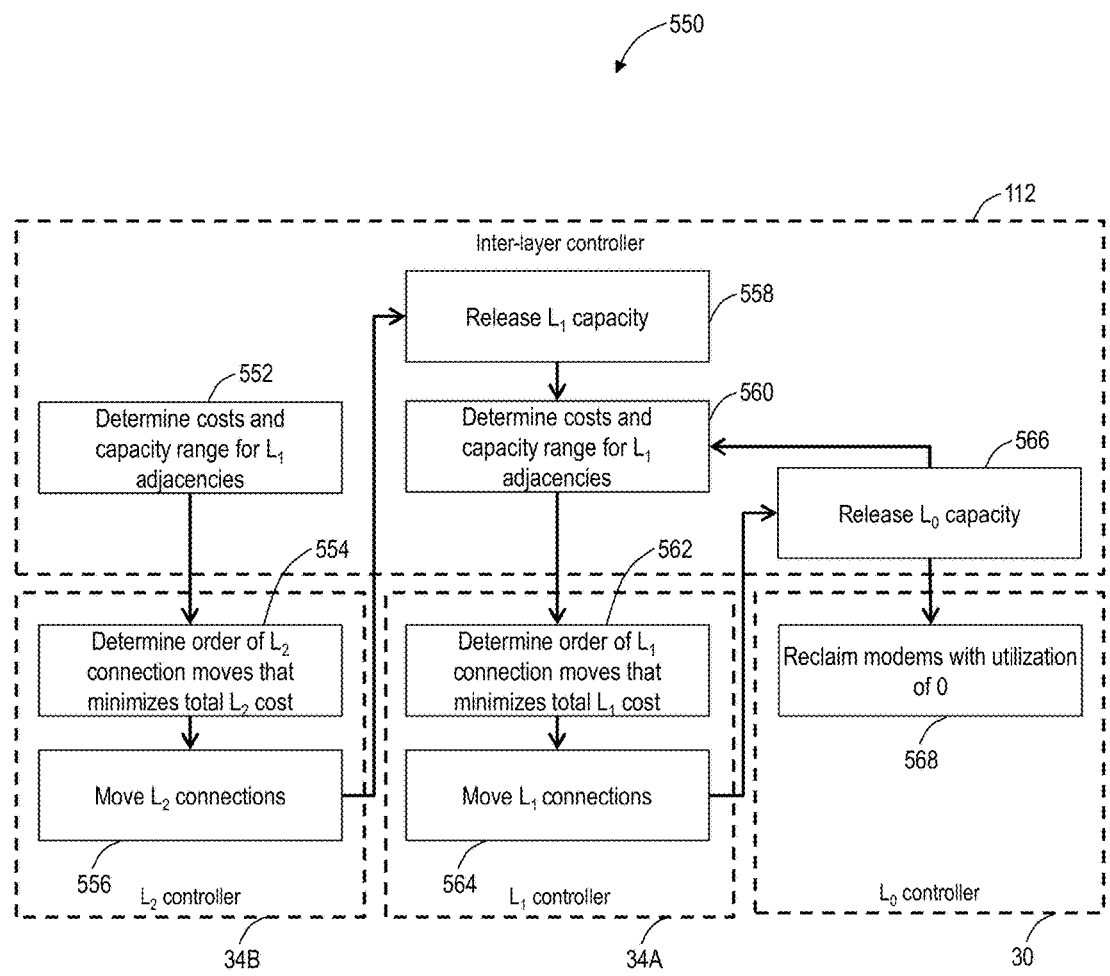
FIG. 16 is a flowchart of a hierarchical modem reclamation process through shared link costs adjustment over three layers.

Referring to FIG. 16, in an exemplary embodiment, a flowchart illustrates a hierarchical modem reclamation process 552 through shared link costs adjustment over three layers. Again, logical separation is shown for which steps are performed by a $L_1$ controller 34A (e.g., TDM), a $L_2$ controller 34B (e.g., packet), the inter-layer controller 112, and the $L_0$ controller 30. Of course, other controller implementations are also contemplated. The hierarchical modem reclamation process 552 includes determining costs and capacity range for $L_1$ adjacencies (step 552), determining order of $L_2$ connection moves that minimizes total $L_2$ cost (step 554), moving $L_2$ connections (step 556), releasing $L_1$ capacity (step 558), determining costs and capacity range for $L_1$ adjacencies (step 560), determining order of $L_1$ connection moves that minimizes total $L_1$ cost (step 562), moving $L_1$ connections (step 564), releasing $L_0$ capacity (step 566), and reclaiming modems with utilization of 0 (step 568). In an exemplary embodiment, the $L_1$ controller 34A performs steps 562, 564, the $L_2$ controller 34B performs steps 554, 556, the inter-layer controller 112 performs steps 552, 558, 560, 566, and the $L_0$ controller 30 performs step 568.

Recursive Network Service Orchestration with Hierarchical Path Computation

Figure 17:
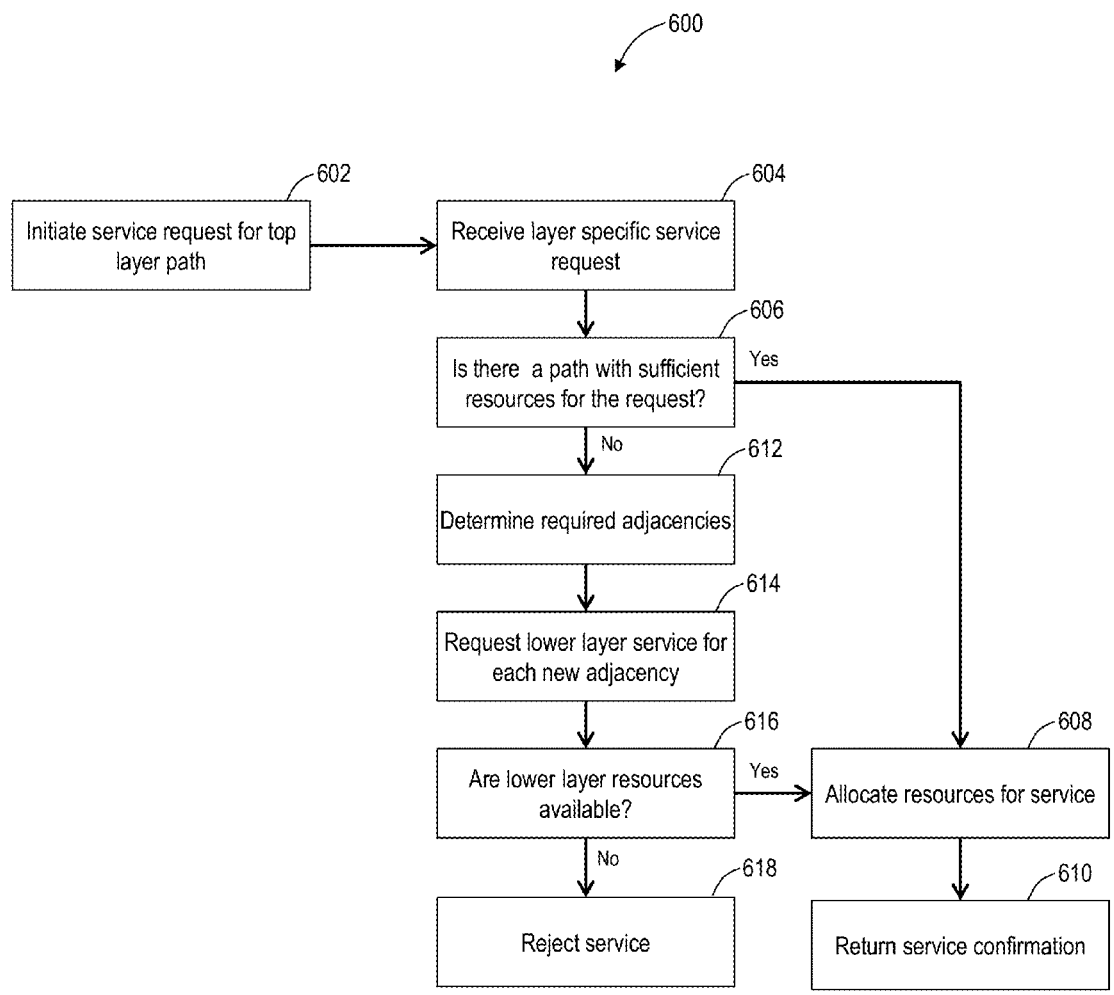
FIG. 17 is a flowchart of a recursive network service orchestration process with hierarchical path computation.

Referring to FIG. 17, in an exemplary embodiment, a flowchart illustrates a recursive network service orchestration process 600 with hierarchical path computation. In an exemplary embodiment, the recursive network service orchestration process 600 can be implemented by the network services orchestrator 50. The network service orchestration process 600 includes initiating a service request for a top layer path (step 602), receiving a layer-specific service request (step 604), and checking if there is a path with sufficient resources for the request (step 606), and if so, allocating resources for the service (step 608) and returning service confirmation (step 610). If there are not sufficient resources (step 606), the network service orchestration process 600 includes determining required adjacencies (step 612), requesting lower layer service for each new adjacency (step 614), and checking if lower layer resources are available (step 616). If there are lower layer resources available (step 616), the network service orchestration process 600 goes to step 608, and if not, the network service orchestration process 600 includes rejecting the service (step 618).

Finding the Minimum Cost Network Layout $L_x$ requires the processes to move connections onto paths that minimize the total network cost. Other embodiments presented here are based on optimization theory. For example, solving the traffic engineering optimization using column generation. Either approach can be extended to implement operational extras, such as connections may not be allowed to be moved, the connection may be required to have hot standby protection, connections may have shared restoration based protection, and connections may have Quality of Service (QoS) restrictions such as maximum latency.

Figure 18:
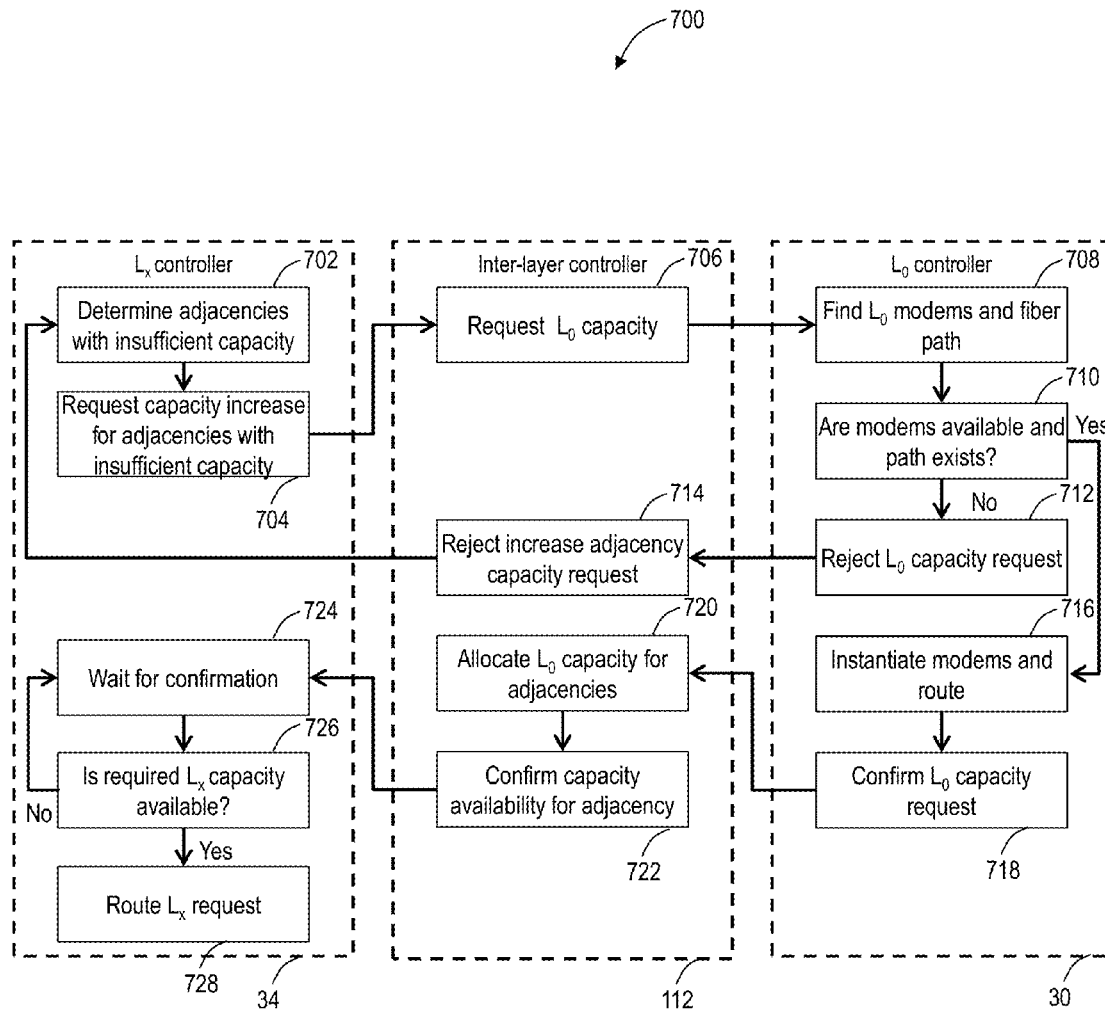
FIG. 18 is a flowchart of a process for inter-layer communications for modem allocation on adjacencies with insufficient capacity.

Inter-Layer Communications for Modem Allocation on Adjacencies with Insufficient Capacity Referring to FIG. 18, in an exemplary embodiment, a flowchart illustrates a process 700 for inter-layer communications for modem allocation on adjacencies with insufficient capacity. Again, logical separation is shown for which steps are performed by the $L_x$ controller 34, the inter-layer controller 112, and the $L_0$ controller 30. Of course, other controller implementations are also contemplated. The process 700 includes determining adjacencies with insufficient capacity (step 702), requesting capacity increase for adjacencies with insufficient capacity (step 704), requesting $L_0$ capacity (step 706), finding $L_0$ modems and fiber path (step 708), checking if modems are available, and the path exists (step 710), and if not, rejecting the L0 capacity request (step 712), rejecting the increase adjacency capacity request (step 714), and returning to step 702. If modems are available, and the path exists (step 710), the process 700 includes instantiating modems and route (step 716), confirming $L_0$ capacity request (step 718), allocating $L_0$ capacity for adjacencies (step 720), confirming capacity availability for adjacency (step 722), waiting for confirmation (step 724), and checking if required $L_x$ capacity is available (step 726), and if not, returning to step 724 and if so, routing the $L_x$ request (step 728). In an exemplary embodiment, the $L_x$ controller 34 performs steps 702, 704, 724, 726, 728, the inter-layer controller 112 performs steps 706, 714, 720, 722, and the $L_0$ controller 30 performs steps 708, 710, 712, 716, 718.

Creating Adjacencies with Additional Lower Layer Resources

Figure 19:
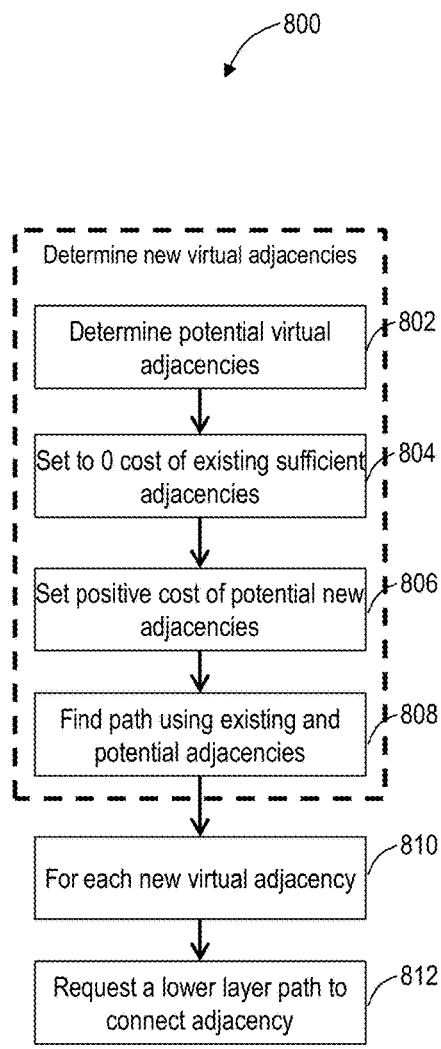
FIG. 19 is a flowchart of a process for creating adjacencies with additional lower layer resources.

Referring to FIG. 19, in an exemplary embodiment, a flowchart illustrates a process 800 for creating adjacencies with additional lower layer resources. The process 800 includes determining potential virtual adjacencies (step 802), setting to zero the cost of existing sufficient adjacencies (step 804), setting a positive cost of potential new adjacencies (step 806), finding a path using existing and potential adjacencies (step 808), for each new virtual adjacency (step 810), and requesting a lower layer path to connect the adjacency (step 812).

If an upper layer cannot provide resources to support requested capacity, it may request new resources from lower layers. Ideally, the newly added lower layer resources complement the existing resources and are added incrementally to maximize the efficiency of used lower layer resources. From the upper layers point of view, a lower layer provides virtual links (adjacencies) between upper layer switching points. If the upper layer does not have full visibility into the lower layer, it needs to request set up of virtual adjacencies from the lower layer.

New adjacencies can be found with shortest path algorithm. To prevent the proliferation of lower layer resources, the upper layer puts a cost to new link creation and uses the shortest path to find new adjacencies. Potential adjacencies are determined from existing adjacencies, and currently inexistent adjacencies through the knowledge of possible adjacencies (i.e. the existence of fiber paths). If a path is found in the graph with all adjacencies known, new virtual adjacencies are the potential adjacencies with positive costs. Each new adjacency represents a new path that should be setup in the lower layer.

Finding a Path in the Lowest Layer ($L_0$)

The lowest layer in the protocol stack provides direct links through the fiber network. These links are in the form of wavelengths connecting switching points, ROADMs, amplifiers, plug-in units, etc. A request for a new wavelength implies that there is a service request coming from one of the upper layers for which the capacity of the existing wavelengths is insufficient. An established wavelength(s) may indeed exist, but it may not have sufficient capacity. A fiber path exists, but no wavelength is established on the path.

When a request for additional $L_0$ capacity arrives, the controller in the layer has several options, such as, create a new wavelength to connect the requested points, increase the available capacity on an existing wavelength, if there is one already connecting the requested points, create a new wavelength with higher capacity, transfer existing traffic on it, and release the modem and the wavelength, etc.

When a request for removing $L_0$ capacity arrives, the controller has several options including i) do nothing at the time of request, but clean up unused capacity later, ii) if the requested capacity is the only capacity on a wavelength, delete the wavelength, iii) if the requested capacity is not the only capacity on a wavelength, reduce the capacity available on the wavelength, iv) if the requested capacity is not the only capacity on a wavelength, reduce the capacity of the wavelength.

Dedicated Protection

The optimization can be extended to include traffic protection by using a pair of paths for each demand, instead of single paths as in (1). Suppose that each working path in $p \in \mathcal{P}_k$ has a corresponding protection path p'. The two paths can be chosen by finding a shortest cycle instead of shortest path. The optimization can then have two variables for each path pair $x_p$ and $x_{p'}$, corresponding to working and protection bandwidths. The constraints (1c) are updated to reflect the capacity of the restoration bandwidth $$\sum_{p \in \mathcal{P}_e} x_p + \sum_{p' \in \mathcal{P}_e} x_{p'} - y_e \leq 0, e \in \varepsilon.$$

Constraints are also added to ensure that working and protection traffics are the same $$x_p = x_{p'}, p \in \mathcal{P}_k.$$

Mesh Restoration

The optimization can be enhanced by adding restoration of $L_x$ traffic in case of individual link failures. We introduce new variables $x_p^{(e)}$, corresponding to capacity allocated on path p to route some of the traffic that was previously carried on failed $L_x$ adjacency e. The protection paths are chosen so that diversity requirements are met, by for example ensuring that the protection path does not traverse any of the links in the same shared-link risk group (SRLG) as the failed link. Traffic carried with $x_p^{(e)}$ does not carry any of the traffic that was originally on e. To ensure that the traffic can be carried under the failure of each link, in addition to working traffic constraints (1b), we add the following constraints to the optimization $$\sum_{p \in \mathcal{P}_k} x_p + \sum_{p \in \mathcal{P}_k} x_p^{(e)} - \sum_{p \in \mathcal{P}_e} x_p \geq D_k, e \in \varepsilon,$$

which ensure that traffic carried on link e is carried even in the link fails. The second summation adds the restoration traffic, while the third summation removes the failed traffic. Also the available capacity constraints (1c) should be able support both the working and protection traffic $$\sum_{p \in \mathcal{P}_e} x_p + \sum_{e_f \in \varepsilon \setminus e} \sum_{p \in \mathcal{P}_e} x_p^{(e_f)} - y_e \leq 0, e \in \varepsilon.$$

Shared mesh restoration can be added with a following, alternative, set of constraints $$\sum_{p \in \mathcal{P}_e} x_p + \max_{e_f \in \varepsilon \setminus e} \left\{ \sum_{p \in \mathcal{P}_e} x_p^{(e_f)} \right\} - y_e \leq 0, e \in \varepsilon,$$

which can be written as two sets of constraints for linear programming with the help of variables $w_e$ corresponding the amount of mesh protected traffic traversing link e $$\sum_{p \in \mathcal{P}_e} x_p + m_e - y_e \leq 0, e \in \varepsilon,$$

$$\sum_{p \in \mathcal{P}_e} x_p^{(e_f)} - m_e \leq 0, e \in \varepsilon, e_f \in \varepsilon \setminus e.$$

Adding the protection and working traffic constraints to the optimization makes a difference inside the algorithms in the step that determines which connections to move in $L_x$. This can be changed transparently without changing the general outlines any of the algorithms.

Exemplary Controller

Figure 20:
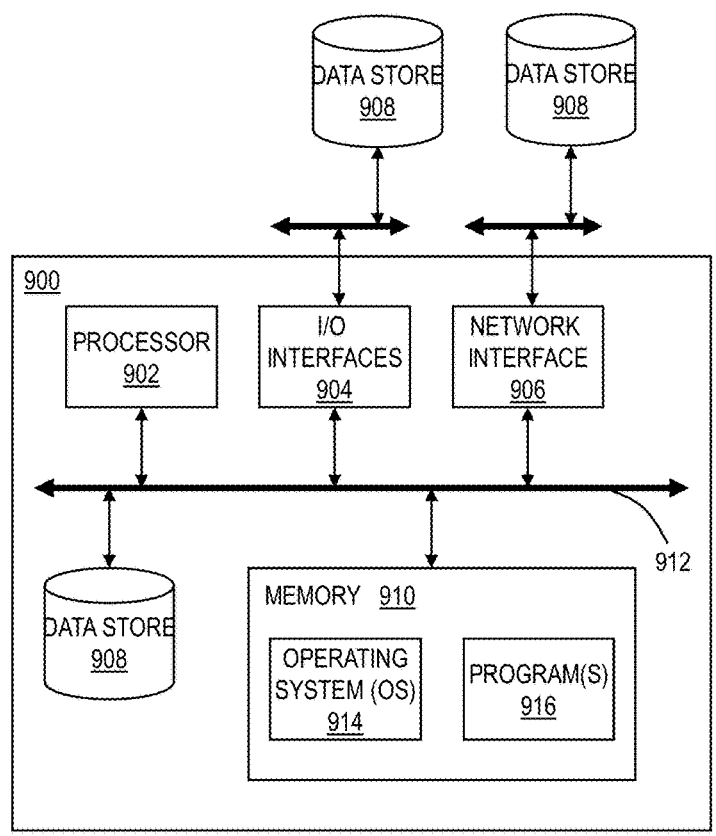
FIG. 20 is a block diagram of a server, which can be used to realize various aspects of the modem reclamation systems and methods.

Referring to FIG. 20, in an exemplary embodiment, a block diagram illustrates a server 900, which can be used to realize various aspects of the modem reclamation systems and methods. In an exemplary embodiment, one or more servers 900 can form the various controllers described herein. The server 900 can be a digital computer that, in terms of hardware architecture, generally includes a processor 902, input/output (I/O) interfaces 904, a network interface 906, a data store 908, and memory 910. It should be appreciated by those of ordinary skill in the art that FIG. 20 depicts the server 900 in an oversimplified manner, and a practical embodiment may include additional components and suitably configured processing logic to support known or conventional operating features that are not described in detail herein. The components (902, 904, 906, 908, and 910) are communicatively coupled via a local interface 912. The local interface 912 can be, for example, but not limited to, one or more buses or other wired or wireless connections, as is known in the art. The local interface 912 can have additional elements, which are omitted for simplicity, such as controllers, buffers (caches), drivers, repeaters, and receivers, among many others, to enable communications. Further, the local interface 912 can include address, control, and/or data connections to enable appropriate communications among the aforementioned components.

The processor 902 is a hardware device for executing software instructions. The processor 902 can be any custom made or commercially available processor, a central processing unit (CPU), an auxiliary processor among several processors associated with the server 900, a semiconductor-based microprocessor (in the form of a microchip or chip set), or generally any device for executing software instructions. When the server 900 is in operation, the processor 902 is configured to execute software stored within the memory 910, to communicate data to and from the memory 910, and to generally control operations of the server 900 pursuant to the software instructions. The I/O interfaces 904 can be used to receive user input from and/or for providing system output to one or more devices or components. User input can be provided via, for example, a keyboard, touchpad, and/or a mouse. System output can be provided via a display device and a printer (not shown). I/O interfaces 904 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 906 can be used to enable the server 900 to communicate on a network, such as in the networks 10, 60, etc. The network interface 906 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 906 can include address, control, and/or data connections to enable appropriate communications on the network. A data store 908 can be used to store data. The data store 908 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 908 can incorporate electronic, magnetic, optical, and/or other types of storage media. In one example, the data store 908 can be located internal to the server 900 such as, for example, an internal hard drive connected to the local interface 912 in the server 900. Additionally, in another embodiment, the data store 908 can be located external to the server 900 such as, for example, an external hard drive connected to the I/O interfaces 904 (e.g., SCSI or USB connection). In a further embodiment, the data store 908 can be connected to the server 900 through a network, such as, for example, a network attached file server.

The memory 910 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 910 can incorporate electronic, magnetic, optical, and/or other types of storage media. Note that the memory 910 can have a distributed architecture, where various components are situated remotely from one another, but can be accessed by the processor 902. The software in memory 910 can include one or more software programs, each of which includes an ordered listing of executable instructions for implementing logical functions. The software in the memory 910 includes a suitable operating system (O/S) 914 and one or more programs 916. The operating system 914 essentially controls the execution of other computer programs, such as the one or more programs 916, and provides scheduling, input-output control, file and data management, memory management, and communication control and related services. The one or more programs 916 may be configured to implement the various processes, algorithms, methods, techniques, etc. described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

SDN Management Plane

Figure 21:
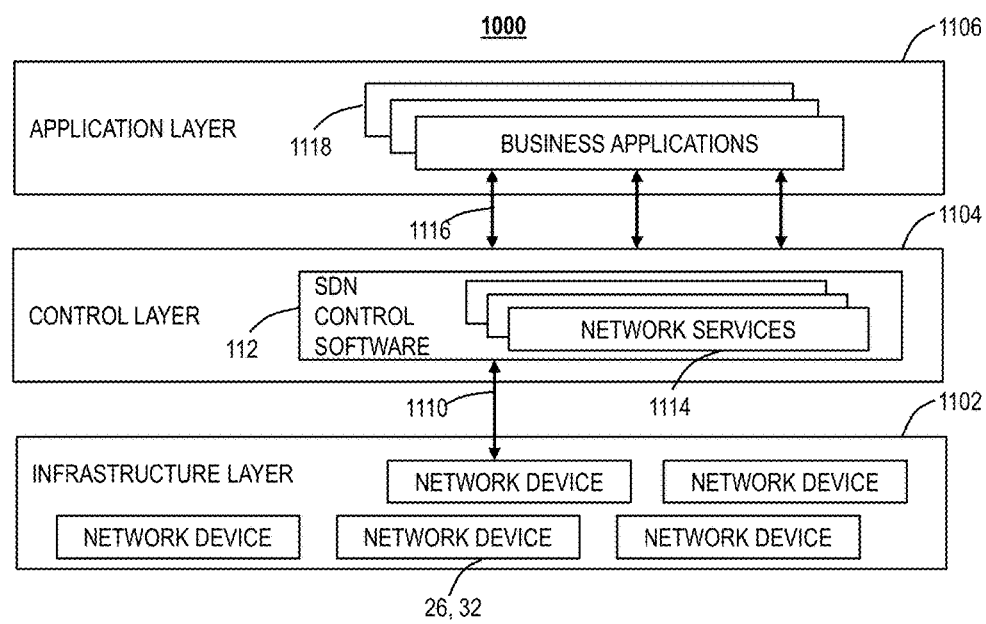
FIG. 21 is a block diagram of functional components of an SDN environment, in which the modem reclamation systems and methods can operate.

Referring to FIG. 21, in an exemplary embodiment, a block diagram illustrates functional components of an SDN environment 1000, in which the modem reclamation systems and methods can operate. The SDN environment 1000 includes a programmable infrastructure layer 1102, a control layer 1104, and an application layer 1106. The layers 1104, 1106 can be implemented on a server or the like such as illustrated in FIG. 20 and the functional components can be implemented in software executed on the server. The programmable infrastructure layer 1102 includes network devices such as the network elements 26 and the switches 32 and is communicatively coupled to the control layer 1104 via an interface 1110 such as OpenFlow, for example. The control layer 1104 facilitates communication between the application layer 1106 and the network elements 26 and the switches 32 in programmable infrastructure layer 1102. The control layer 1104 includes SDN control software 1112 with a plurality of network services 1114. The control layer 1104 provides SDN functionality to manage network services through abstraction of lower level functionality. The application layer 1106 communicates with the control layer 1104 through various Application Programming Interfaces (APIs) 1116. The application layer 1106 provides end user connectivity to the SDN environment 1000 such as software modules and/or functions responsible for creating the desired path and flow connections on the physical network through various business applications 1118. In an exemplary embodiment, the systems and methods described herein are implemented as one of the business applications 1118 on an SDN controller and/or on a separate server 900.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A modem reclamation method comprising:
in one or more controllers communicatively coupled to a network including a media layer, $L_0$, over which one or more digital layers, $L_x$, with routed traffic is ultimately carried, determining costs and capacity range for $L_x$ adjacencies in the network based on $L_x$ information and $L_0$ information, wherein $L_0$ is formed with optical modems at various nodes in the network that communicate to one another over links;
determining an order of $L_x$ connection moves utilizing an optimization technique that minimizes the costs of the $L_x$ adjacencies by searching for a set of the optical modems that can be turned off while existing traffic of the $L_x$ adjacencies are still supported, to reclaim or minimize optical modem use such that the set of optical modems are freed for other traffic; and
performing the $L_x$ connection moves through changes in the network based on the order and updating the $L_x$ adjacencies.

2. The modem reclamation method of claim 1, further comprising:
performing one of i) repeating the determining steps and the performing step and ii) reclaiming one or more optical modems subsequent to the $L_x$ connection moves, responsive to whether stopping criteria is met.

3. The modem reclamation method of claim 1, further comprising:
subsequent to the $L_x$ connection moves, disabling the optical modems with no $L_x$ adjacencies thereon.

4. The modem reclamation method of claim 1, wherein the capacity range for the $L_x$ adjacencies is determined based on an order in which the optical modems are disabled and links with disabled modems have their associated capacity range decreased accordingly.

5. The modem reclamation method of claim 1, wherein the optimization technique comprises one of a heuristically calculated merit of removing each modem, Lagrangian decomposition, and Bender's decomposition.

6. The modem reclamation method of claim 1, wherein the costs for the $L_x$ adjacencies are based on one or more of i) where modems are disabled, ii) utilization of the $L_x$ adjacencies and (iii) network policy.

7. The modem reclamation method of claim 1, wherein the method is implemented in one or more of a $L_x$ controller, a $L_0$ controller, and an inter-layer controller, wherein when the method is implemented by multiple controllers, each of the multiple controllers is adapted to communicate to one another.

8. The modem reclamation method of claim 1, wherein the $L_x$ is the digital layer comprising one or more of Time Division Multiplexing (TDM) and packet layer traffic and $L_0$ is a Dense Wave Division Multiplexing (DWDM) layer, and wherein the $L_x$ adjacencies are optimized to minimize optical modem usage in the DWDM layer.

9. A modem reclamation system for optimizing optical modem use in a network, the modem reclamation system comprising:
an interface communicatively coupled to the network which includes a media layer, $L_0$, over which one or more digital layers, $L_x$, with routed traffic is ultimately carried;
circuitry adapted to determine costs and capacity range for $L_x$ adjacencies in the network based on $L_x$ information and $L_0$ information, $L_0$ is formed with optical modems at various nodes in the network that communicate to one another over links;
circuitry adapted to determine an order of $L_x$ connection moves utilizing an optimization technique that minimizes the costs of the $L_x$ adjacencies by searching for a set of the optical modems that can be turned off while existing traffic of the $L_x$ adjacencies are still supported, to reclaim or minimize optical modem use such that the set of optical modems are freed for other traffic; and
circuitry adapted to cause the $L_x$ connection moves through changes in the network based on the order and updating the $L_x$ adjacencies.

10. The modem reclamation system of claim 9, further comprising:
circuitry adapted to perform one of i) cause repetition the determine costs and capacity range, the determine the order and the $L_x$ connection moves and ii) cause reclamation of one or more optical modems subsequent to the $L_x$ connection moves, responsive to whether stopping criteria is met.

11. The modem reclamation system of claim 9, further comprising:
circuitry adapted to, subsequent to the $L_x$ connection moves, causes disablement of the optical modems with no $L_x$ adjacencies thereon.

12. The modem reclamation system of claim 9, wherein the capacity range for the $L_x$ adjacencies is determined based on an order in which the optical modems are disabled and links with disabled modems have their associated capacity range decreased accordingly.

13. The modem reclamation system of claim 9, wherein the optimization technique comprises one of a heuristically calculated merit of removing each modem, Lagrangian decomposition, and Bender's decomposition.

14. The modem reclamation system of claim 9, wherein the costs for the $L_x$ adjacencies are based on one or more of i) where modems are disabled, ii) utilization of the $L_x$ adjacencies and (iii) network policy.

15. The modem reclamation system of claim 9, wherein the $L_x$ is the digital layer comprising one or more of Time Division Multiplexing (TDM) and packet layer traffic and $L_0$ is a Dense Wave Division Multiplexing (DWDM) layer, and wherein the $L_x$ adjacencies are optimized to minimize optical modem usage in the DWDM layer.

16. A system of controllers, comprising:
- at least one $L_x$ controller;
- at least one $L_0$ controller; and
- an inter-layer controller, each controller is communicatively coupled to a network including a media layer, $L_0$, over which one or more digital layers, $L_x$, with routed traffic is ultimately carried,
- wherein the at least one $L_x$ controller, the at least one $L_0$ controller, and the inter-layer controller are configured to
  - determine costs and capacity range for $L_x$ adjacencies in the network based on $L_x$ information and $L_0$ information, wherein $L_0$ is formed with optical modems at various nodes in the network that communicate to one another over links;
  - determine an order of $L_x$ connection moves utilizing an optimization technique that minimizes the costs of the $L_x$ adjacencies by searching for a set of the optical modems that can be turned off while existing traffic of the $L_x$ adjacencies are still supported, to reclaim or minimize optical modem use such that the set of optical modems are freed for other traffic; and
  - cause the $L_x$ connection moves through changes in the network based on the order and updating the $L_x$ adjacencies.

17. The system of claim 16, wherein the $L_x$ is the digital layer comprising one or more of Time Division Multiplexing (TDM) and packet layer traffic and $L_0$ is a Dense Wave Division Multiplexing (DWDM) layer, and wherein the $L_x$ adjacencies are optimized to minimize optical modem usage in the DWDM layer.

18. The system of claim 16, wherein the at least one $L_x$ controller, the at least one $L_0$ controller, and the inter-layer controller are in one of a monolithic configuration, a hierarchical configuration, and a distributed configuration.

* * * * *